United States Patent

Okada et al.

Patent Number: 5,558,803
Date of Patent: *Sep. 24, 1996

[54] ELECTRORHEOLOGICAL FLUID WITH IMPROVED PROPERTIES COMPRISING COMPOSITE POLYMER

[75] Inventors: Izuho Okada; Yoshinobu Asako; Kiyomi Arimatsu; Minoru Kobayashi; Satoru Ono; Ryuji Aizawa, all of Ibaraki-ken, Japan

[73] Assignee: Nippon Shokubai Co., Ltd., Osaka-fu, Japan

[ * ] Notice: The term of this patent shall not extend beyond the expiration date of Pat. No. 5,376,294.

[21] Appl. No.: 362,175

[22] Filed: Dec. 22, 1994

Related U.S. Application Data

[63] Continuation-in-part of Ser. No. 89,126, Jul. 9, 1993, Pat. No. 5,376,294, which is a continuation-in-part of Ser. No. 810,496, Dec. 19, 1921, abandoned.

[30] Foreign Application Priority Data

| Aug. 29, 1991 | [JP] | Japan | 3-218227 |
| Oct. 21, 1991 | [JP] | Japan | 3-272212 |
| Feb. 25, 1993 | [JP] | Japan | 5-36323 |
| Feb. 25, 1993 | [JP] | Japan | 5-36324 |
| Feb. 25, 1993 | [JP] | Japan | 5-36325 |
| Feb. 25, 1993 | [JP] | Japan | 5-36326 |

[51] Int. Cl.$^6$ ............ C10M 169/04; C10M 171/00
[52] U.S. Cl. ............ 252/78.3; 252/73; 252/572
[58] Field of Search ............ 252/78.3, 73, 572; 556/440, 453, 445, 415, 419, 420; 528/25, 26, 28, 32, 33, 41, 43

[56] References Cited

U.S. PATENT DOCUMENTS

| 4,153,641 | 5/1979 | Deichert et al. | 556/440 |
| 4,604,479 | 8/1986 | Ellis | 556/440 |
| 4,645,614 | 2/1987 | Goossens et al. | 252/75 |
| 4,772,407 | 9/1988 | Carlson | 252/74 |
| 5,039,761 | 8/1991 | Ono et al. | 556/440 |
| 5,049,617 | 9/1991 | Yoshioka et al. | 556/440 |
| 5,087,382 | 2/1992 | Ishino et al. | 252/73 |
| 5,213,704 | 5/1993 | Anderson, Jr. et al. | 252/78.3 |
| 5,252,250 | 10/1993 | Endo et al. | 252/78.3 |
| 5,326,489 | 7/1994 | Asako et al. | 252/572 |
| 5,376,294 | 12/1994 | Okada et al. | 252/78.3 |

FOREIGN PATENT DOCUMENTS

| 0529166 | 3/1993 | European Pat. Off. |
| 62-153295 | 7/1987 | Japan . |
| 5-86075 | 4/1993 | Japan . |

*Primary Examiner*—Christine Skane
*Attorney, Agent, or Firm*—Omri M. Behr, Esq.

[57] ABSTRACT

An electrorheological fluid comprising dielectric particles and an insulating liquid and characterized by exhibiting a viscosity of not more than 0.2 Pa•s at a shear rate of 33/s when measured at 25° C. in the absence of supply of an electric field and a structural viscosity satisfying the condition of the formula (1):

$$0.01\ Pa\bullet s \leq \eta_1 - \eta_2 \leq 0.5\ Pa\bullet s \qquad (1)$$

wherein $\eta_1$ is a viscosity in at a shear rate of 3.3/s when measured at 25° C. in the absence of supply of an electric field and $\eta_2$ is a viscosity in at a shear rate of 33/s when measured at 25° C. in the absence of supply of an electric field. This electrorheological fluid generates a large shear stress, exhibits an excellent current property and an excellent durability, and excels particularly in dispersion stability, redispersibility and fluidity.

15 Claims, No Drawings

ELECTRORHEOLOGICAL FLUID WITH IMPROVED PROPERTIES COMPRISING COMPOSITE POLYMER

This application is a continuation-in-part of application Ser. No. 08/089,126 filed Jul. 9, 1993 now U.S. Pat. No. 5,376,294, which is a continuation-in-part of Ser. No. 07/810,496 filed Dec. 19, 1912 now abandoned.

BACKGROUND OF THE INVENTION

1. Field of the Invention

The present invention relates to an electrorheological fluid. More specifically, it relates to an electrorheological fluid which has excellent properties in that a large shear stress and low current density can be generated even when a relatively low electric field is applied to the fluid and the generated shear stress and current density has excellent stability properties with time (durability). The invention also has excellent properties in regard to dispersion stability under the conditions of no electric field (the ability to uniformly maintain an electrorheological fluid and not settle or float the dispersed phase therein), redispersibility (the ability to duplicate a uniform electrorheological fluid by applying a simple external force when the dispersed phase therein has settled and floats in a non-uniform state), and fluidity (having a low viscosity under the conditions of no electric field).

2. Description of the Prior Art

There are known, as electrorheological fluids generating high shear stress, a fluid in which a powdered ion-exchange resin is dispersed in the higher alkyl ester of an aromatic carboxylic acid (Japanese Kokai (Japanese patent Laid-open) 50-92278), a composition composed of a crystalline material which conducts current only along one of the three crystalline axes, a dielectric fluid, and suspension stabilizing agent (Japanese Kokai 1-170693), and a fluid using, as a dispersed phase, a conductive particle covered with a film layer of insulating material (Japanese Kokai 64-6093). However, these electrorheological fluids have the disadvantages of poor dispersion stability under the conditions of no electrical field, poor redispersibility after sedimentation and floatation, and poor fluidity when the concentration of the dispersed phase is increased.

In order to improve the dispersion stability, there have been proposed the use of modified polysiloxane as an additive (Japanese Kokai 3-39560), the use of a polymer having an ester group and an aromatic group structure as the additive (Japanese Kokai 4-96997) or the like. However, these additives serve only to prevent the sedimentation of the dispersed phase particles, but have the drawback of a reduction of the redispersibility after sedimentation.

In order to improve the redispersibility, there have been proposed electrorheological fluids using fine particles as the additive (Japanese Kokai 3-160094 and Japanese Kokai 3-166295) or the like. However, these electrorheological fluids have problems in that the shear stress obtained when an electric field is applied, decreases due to the addition of the fine particles, the conditions of use for the electrorheological Fluids are defined due to the poor dispersion stability, and it is necessary for the device used to be equipped with an additional redispersibility system.

An object of the present invention, therefore, is to provide an electrorheological fluid.

Another object of the present invention is to provide an electrorheological fluid which has excellent properties in that even when a relatively low electric field is applied to the fluid, a large shear stress is generated while the current density is small, and the generated shear stress and current density exhibit excellent stability with time (durability). The invention also has excellent properties in regard to dispersion stability under the conditions of no electrical field (the ability to uniformly maintain an electrorheological fluid and not settle or float the dispersed phase therein), redispersibility (the ability to duplicate a uniform electrorheological fluid by applying a simple eternal force when the dispersed phase has settled and floated in a non-uniform state), an fluidity (having a low viscosity under the conditions of no electric field).

SUMMARY OF THE INVENTION

According to the present invention, there is provided an electrorheological fluid comprising dielectric particles as dispersed phase and an insulating liquid as dispersing medium and characterized by exhibiting a viscosity of not more than 0.2 Pa•s at a shear rate of 33/s when measured at 25° C. in the absence of supply of an electric field and a structural viscosity satisfying the condition of the formula (1):

$$0.01\ Pa\cdot s \leq \eta_1 - \eta_2 \leq 0.5\ Pa\cdot s \tag{1}$$

wherein $\eta_1$ is a viscosity at a shear rate of 3.3/s when measured at 25° C. in the absence of supply of an electric field and $\eta_2$ is a viscosity at a shear rate of 33/s when measured at 25° C. in the absence of supply of an electric field.

The electrorheological fluid of this invention exhibits excellent properties in that a large shear stress and low current density can be generated even when a relatively low electric field is applied to the fluid and the generated shear stress and current density has excellent stability properties with time (durability).

The eleotrorheologieal fluid of this invention also has excellent properties in regard to dispersion stability under the conditions of no electric field (the ability to uniformly maintain an electrorheological fluid and not settle or float the disperse phase therein), redispersibility (the ability to duplicate a uniform electrorheological fluid by applying a simple external force when the disperse phase therein has settled and floats in a non-uniform state), and fluidity (having a low viscosity under the conditions of no electric field). Therefore, the electrorheological fluid of this invention can be effectively used for engine mount, clutch, damper, brakes, shock absorber, actuator, value, and the like.

DESCRIPTION OF THE PREFERRED EMBODIMENT

In order to develope devices operating by an electrorheological fluid, it is necessary that dispersion stability, redisperbility and fluidity of the fluid are good. It is particularly desirable that an electrorheological fluid has good shear stress property, current property and durability in addition to good dispersion stability, redispersibility and fluidity. We supposed that the properties (dispersion stability, redispersibility and fluidity) were dependent on the state of existence of dielectric particles in an inslating liquid. Then we found that the properties of an electrorheological fluid were ideally improved when the fluid exhibited structural viscosity while it possessed low viscosity in absence of supply of an electric field. The electrorheological fluid of this invention, therefore, is required to manifest the specific viscosity and the structural viscosity which is represented by the specific condition formula, mentioned above.

The expression "structural viscosity manifested by an electrorheological fluid" as used in this invention means the specific viscous form to be caused by a structure which is composed of dielectric particles and an insulating liquid in consequence of weak aggregation of the dielectric particles in the insulating liquid. This structural viscosity is controlled by the intensity of an interaction between a dielectric particle and other dielectric particle, and it gives suitable dispersion stability and suitable redispersibility to the electrorheological fluid.

The viscosity of the electrorheological fluid of this invention is required to be not more than 0.2 Pa·s at a shear rate of 33/s when measured at 25° C. in the absence of an electric field preferably to be in the range of 0.02 to 0.2 Pa·s. The viscosity is more preferable to be in the range of 0.03 to 0.1 Pa·s. If the viscosity exceeds 0.2 Pa·s, the produced electrorheological fluid is at a disadvantage in exhibiting only poor fluidity and, at the same time, failing to acquire a sufficient electrorheological effect in consequence of the supply of an electric field or presenting difficulties to the design of a device.

The structural viscosity which is manifested by the electrorheological fluid of this invention is required to satisfy the condition of the following formula (1).

$$0.01\ Pa\cdot s \leq \eta_1 - \eta_2 \leq 0.5\ Pa\cdot s \tag{1}$$

wherein $\eta_1$ is a viscosity of at a shear rate of 3.3/s when measured at 25° C. in the absence of supply of an electric field and $\eta_2$ is a viscosity at a shear rate of 33/s when measured at 25° C. in the absence of supply of an electric field (hereinafter the difference, $\eta_1 - \eta_2$, will be referred to simply as "Ti")].

As indicated by the formula (1), the Ti value of the electrorheological fluid of this invention is required to be in the range from not less than 0.01 Pa·s to not more than 0.5 Pa·s. Preferably, this range is from not less than 0.01 Pa·s to not less than 0.2 Pa·s. When the Ti value is in this range, the eleotrorheological fluid satisfies the dispersion stability, the redispersibility, and the fluidity at higher levels. If the Ti value is less than 0.01 Pa·s, the structural viscosity is insufficient and the dispersion stability is insufficient. If the Ti value exceeds 0.5 Pa·s, the fluidity is insufficient.

The structural viscosity is preferable to satisfy the condition of the following formula (3)

$$1.1 \leq \eta_1/\eta_2 \leq 3 \tag{3}$$

wherein $\eta_1$ and $\eta_2$ are the same as defined above. The value of $\eta_1/\eta_2$ is more preferable to be in the range from not less than 1.15 to not more than 2. If the value is less than 1.1, the electrorheological fluid may show poor dispersion stability. If the value is more than 3, the electrorheologioal fluid may show poor redispersibility and poor fluidity.

The electrorheological fluid is preferable to exhibit a viscosity in the range of 0.02 to 0.2 Pa·s at a shear rate of 33/s when measured at 25° C. in the absence of an electric field and a structural viscosity to satisfy the conditions of the following formulae (2) and (3).

$$0.01\ Pa\cdot s \leq \eta_1 - \eta_2 \leq 0.2\ Pa\cdot s \tag{2}$$

$$1.1 \leq \eta_1/\eta_2 \leq 3 \tag{3}$$

wherein $\eta_1$ and $\eta_2$ are the same as defined above. When an electrorheological fluid exhibits the very low viscosity as described above and the structural viscosity to satisfy the conditions, the fluid exhibit can show the excellent dispersion stability, redispersibility and fluidity. When an electrorheological fluid exhibits the very low viscosity, we found that the small value of $\eta_1/\eta_2$, e.g. in the range of 1.1 to 1.5 is effective. The value of $\eta_1/\eta_2$ in the range of 1.5 to 3 is effective, too.

The dielectric particles to be used as dispersed phase are preferable to have an average particle diameter of 1 to 50 μm, more preferably 3 to 20 μm, If the average particle diameter is not more than 1 μm, the resultant electrorheological fluid is not likely to induce a large shear stress when an electric field is applied. Adversely, If the average particle diameter is not less than 50 μm, it is difficult to obtain an electrorheological fluid with excellent dispersion stability.

The dielectric particles are particles which can be polarized when an electric field is applied. Examples of the dielectric particles are, but not limited to, organic particles having an hydrophilic group such as starch, cellulose, an ion-exchange resin, and a sulphonic acid group-containing polystyrene polymer; hydrophilic inorganic particles such as silica and alumina; a composite particle being a particle having three layers with an organic solid particle for center portion, a conductive film layer covering the organic solid particle, and an electric insulating film layer covering the conductive film layer, a particle in which the surface of a conductive particle such as aluminum is covered with a thin insulating film, a carbonaceous powder, a particle obtained by dispersing a conductive particle such as carbon black into a resin; an organic semiconductive particle such as poly-(acene-quinone); ferroelectric particles such as barium titanate, lithium tartrate. In view of the large shear stress, small current density when an electric field is applied and excellent durability, a sulfonic acid group-containing polystyrene polymer is preferred among the mentioned particles.

The dispersing medium to be used for the electrorheological fluid of the present invention is an insulating liquid. Examples of the insulating liquid are, but not limited to, silicone oils such as polydimethylsiloxane, a partially octyl replaced polydimethyl-siloxane, a partially phenyl replaced polydimethyl-siloxane; hydrocarbons such as fluid paraffin, decane, methyl naphthalene, decalin, diphenylmethane, and a partially hydrogenated triphenyl; halogenated hydrocarbons such as chlorobenzene, dichlorobenzene, bromobenzene, chlorodiphenyl methane; fluorides of organic compound such as Difloil (a product sold by Daikin industries Ltd. in Japan), Demnum (a product sold by Daikin Industries Ltd. in Japan); and ester compounds such as dioctyl phthalate, trioctyl trimellitate, and dibutyl sebacate. Of these one or more members may be used. In view of the fluidity, the viscosity of the dispersive medium is preferably not more than 0.05 Pa·s.

The insulating liquid is preferable to be a silicon elementcontaining insulating oil and/or a fluorine elementcontaining insulating oil.

The silicon elementcontaining insulating oil has no particular restriction except for the requirement that it should have a silicone oil as a main component thereof and should be a substantially insulating liquid. The silicone oil possesses siloxane structure and generally finds utilities in brake oil, air insulating oil, saturation oil, lubricating oil, polish, component for cosmetic articles, mold release agent, defoaming agent, and the like. As concrete examples of the silicone oil, those already mentioned above may be cited.

The fluorine elementcontaining insulating oil has no particular restriction except for the requirement that it should have a fluoride of organic compounds as a main component thereof and should be a substantially insulating liquid. Low polymers of chlorotrifluoroethylene which are generally used for lubricants and mold release agents, perfluoropolyether oils which are generally used as for lubricants, and fluorine-modified silicone oils which are used as for lubricants may be cited as typical examples.

In this invention, the method for enabling an electrorheological fluid to be endowed with the structural viscosity represented by the specific conditional formula while retaining the specific viscosity mentioned above is not particularly limited. Use of an composite polymer in the electrorheological fluid or treatment of the surface of the dielectric particles with a polymeric compound is effective in implementing the endowment mentioned above.

It is preferable that as the composite polymer, a composite polymer which is substantially insoluble in an insulating liquid and comprises a silicone component-containing structural unit (A). It is more preferable that the composite polymer further comprises a dielectric particle-adsorbing chain-containing structural unit (B).

When the composite polymer which is substantially insoluble in an insulating liquid and comprises both of a silicone component-containing structural unit (A) and a dielectric particle-adsorbing chain-containing structural unit (B), since this composite polymer has the nature of being adsorbed on the surface of the dielectlic particle, an interaction occurs between the composite polymer and the surface of the dielectlic particle. Further, since the composite polymer has the nature of exhibiting affinity for the insulating liquid, an interaction likewise occurs between the composite polymer and the insulating liquid. As a result, a ternary structure is formed through the medium of the composite polymer. Since the composite polymer is substantially insoluble in the insulating-liquid, it is capable of obstructing mutual contact of the dielectlic particles. By using the composite polymer of this description as the composite polymer, the electrorheological fluid can be endowed with the structural viscosity represented by the specific conditional formula while retaining the specific viscosity and, at the same time, can be vested with highly satisfactory dispersion stability, redispersibility, and fluidity.

Though the composite polymer is preferable to be substantially insoluble in the insulating liquid, it may contain not more than 90% by weight of soluble materials. Further, the composite polymer may be partially swelled or wholly swelled by absorbing the insulating liquid so long as it avoids being solved in the insulating liquid and converted into a homogeneous solution. If the composite polymer dissolves in the insulating liquid or instead contains 90% or more by weight of soluble materials, the produced electrorheological fluid will be possibly at a disadvantage in being deficient in redispersibility.

The composite polymer is preferable to possess a silicone component-containing structural unit (A). If the composite polymer does not possess the structural unit (A), the produced electrorheological fluid will be possibly at a disadvantage in being deficient in dispersion stability or fluidity. The term "silicone component" means polysiloxane groups such as, for example, a polydimethylsiloxane group, a partially alkyl group-substituted polydimethylsiloxane group, a partially aryl group-substituted polydimethylsiloxane group, or a tris(trialkylsiloxy)cyclopropyl group.

The silicone component-containing structural unit (A) is preferable to be a polysiloxane-containing structural unit (A-1) represented by the general formula (4):

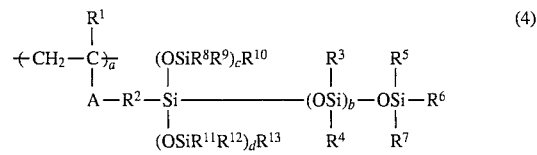

wherein A is —COO— or phenylene group, $R^1$ is hydrogen atom or methyl group, $R^2$ is an alkylene group of 1 to 6 carbon atoms, $R^3$ to $R^{13}$ are independently an aryl group, an alkyl group of 1 to 6 carbon atoms, or an alkoxy group of 1 to 10 carbon atoms, a is an arbitrary integer, c and d are independently an integer in the range of 0 to 10, and b is an integer in the range of 0 to 200.

The composite polymer is preferable to possess a dielectric particle-adsorbing chain-containing structural unit (B). If the composite polymer does not possess the structural unit (B), the produced electrorheological fluid will possibly be at a disadvantage in being deficient in dispersion stability. The adsorption may be in the form of chemical adsorption or physical adsorption. When the interaction between the composite polymer and the surface of the dielectric particles is unduly intense, it will possibly degrade the redispersibility and the fluidity of the produced electrorheological fluid. Thus, the adsorption is desired to be in the form of physical adsorption or electrostatic chemical adsorption. The term "dielectric particle-adsorbing chain" means functional groups such as a hydrocarbon group, a atomic group containing oxygen atom which exhibit the Lewis basicity.

The dielectric particle-adsorbing chain-containing structural unit (B) is preferable to be selected from the group consisting of an alkylene oxide chain-containing structural unit (B-1) represented by the general formula (5):

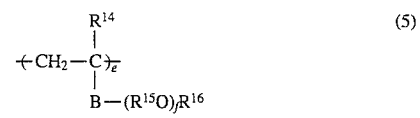

wherein B is —COO— or phenylene group, $R^{14}$ is hydrogen atom or methyl group, $R^{15}$ is an alkylene group of 2 to 4 carbon atoms, $R^{16}$ is hydrogen atom or an alkyl group, e is an arbitrary integer, and f is an integer in the range of 2 to 100, a nitrogen atom-containing structural unit (B-2) represented by the general formula (6):

wherein D is

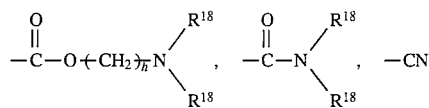

or a nitrogen-containing heterocycle-containing substituent, $R^{17}$ is hydrogen atom or methyl group, $R^{18}$ is hydrogen atom or an alkyl group, g is an arbitrary integer, and h is an integer in the range of 2 to 6, and a hydrocarbon chain-containing structural unit (B-3) represented by the general formula (7):

wherein E is —COO— or phenylene group, $R^{19}$ is hydrogen atom or methyl group, $R^{20}$ is an alkyl group of 4 to 30 carbon atoms, and i is an arbitrary integer.

When the composite polymer is used, it is preferable to be added in the amount in the range of 0.01 to 6 parts by weight, based on 100 parts by weight of the dielectric particles. If the amount of the composite polymer is less than 0.01 part by weight, the produced electrorheological fluid will be possibly at a disadvantage in exhibiting no structural viscosity or acquiring no dispersion stability. If the amount of the composite polymer exceeds 6 parts by weight, the produced electrorheologioal fluid will be possibly at a disadvantage in having the redispersibility and the fluidity thereof notably degraded. It is particularly preferable to use the composite polymer in the amount falling in the range of 0.1 to 5 parts by weight.

As typical examples of the composite polymer, a cross-linked polymer having the silicone component-containing structural unit (A) and the dielectric particle-adsorbing chain-containing structural unit (B); and a composite composed of a particle substantially insoluble in the insulating liquid and a polysiloxane-containing polymer having the silicone component-containing structural unit (A) and the dielectric particle-adsorbing chain-containing structural unit (B), may be cited.

The cross-linked polymer is produced, for example, according to the following procedure, e.g. a method for producing a cross-linked polymer having the silicone component-containing structural unit (A) and the dielectric particle-adsorbing chain-containing structural unit (B).

The composite is produced, for example, according to the following procedure, e.g. a method for a composite composed of a particle substantially insoluble in the insulating liquid and a polysiloxane-containing polymer having the silicone component-containing structural unit (A) and the dielectric particle-adsorbing chain-containing structural unit (B).

The cross-linked polymer and the composite are explained in turn in more detail.

Cross-Linked Polymer

In producing the cross-linked polymer, the preparation method is carried out, for instance, according to the following two procedures, e.g. (1-1) a method for producing a cross-linked polymer by precipitation-polymerization of a monomer mixture (X) containing a silicone macromer (am) represented by the general formula (8):

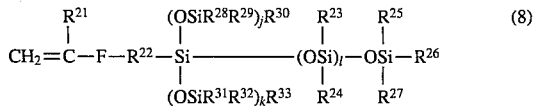

wherein F is —COO— or phenylene group, $R^{21}$ is hydrogen atom or methyl group, $R^{22}$ is an alkylene group of 1 to 6 carbon atoms, $R^{23}$ to $R^{33}$ are independently an aryl group, an alkyl group of 1 to 6 carbon atoms, or an alkoxy group of 1 to 10 carbon atoms, j and k are independently an integer in the range of 0 to 10, and l is an integer in the range of 0 to 200, an alkylene oxide chain-containing macromer (bm-1) represented by the general formula (9):

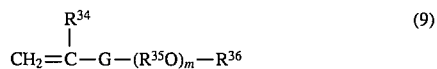

wherein G is —COO— or phenylene group, $R^{34}$ is hydrogen atom or methyl group, $R^{35}$ is an alkylene group of 2 to 4 carbon atoms, $R^{36}$ is hydrogen atom or an alkyl group, and m is an integer in the range of 2 to 100, a crosslinking monomer (cx) having more than two double bonds therein, and an optional monomer (dx), or (1-2) a method for producing a cross-linked polymer by polymerizing a monomer mixture of the silicone macromer (am), the alkylene oxide chain-containing macromer (bm-1), and the optional monomer (dx), and then crosslinking it using the crosslinking monomer (cx). Of these method (1-1) is preferred.

Method (1-1)

The monomer mixture (X) contains four components of the silicone macromer (am), the alkylene oxide chain-containing macromer (bm-1), the crosslinking monomer (cx), and the optional monomer (dx).

As the silicone macromer (am), there are cited for instance, (meth)acryloyl group-containing polydimethyl siloxane, styryl group-containing polydimethyl siloxane, (meth)acryloyl group-containing and partially octyl substituted polydimethyl siloxane, styryl group-containing and partially octyl substituted polydimethyl siloxane, (meth)acryloyl group-containing and partially phenyl substituted polydimethyl siloxane, tris(trimethylsiloxy) silylpropyl-(meth)acrylate. Of these one or more members may be used.

As the alkylene oxide chain-containing monomer (bm- 1), there are cited, for instance, a polyalkylene glycol having a double bond such as a (meth)acryloyl group-containing polyethylene glycol, a styryl group-containing polyethylene glycol, a p-isopropenyl benzyl group-containing polyethylene glycol, a (meth)acryloyl group-containing polypropylene glycol, a styryl group-containing polypropylene glycol, a p-isopropenyl benzyl group-containing polypropylene glycol, a (meth)acryloyl group-containing polytetramethylene glycol, a styryl group-containing polytetramethylene glycol, and a p-isopropenyl benzyl group-containing polytetramethylene glycol. Of these one or more members may be used.

As the crosslinking monomer (cx), there are cited, for instance, a polyfunctional polymerizable aromatic compound such as divinyl benzene, vinyl propenylbenzene, vinyl isopropenylbenzene, vinyl isobutenylbenzene, diisopropenyl benzene, isopropenyl isobutenylbenzene, diisobutenyl benzene, divinyl methylbenzene, divinyl ethylbenzene, divinyl dimethylbenzene, trivinyl benzene, triisopropenyl benzene, divinyl naphthalene, vinyl isopropylnaphthalene, diisopropenyl naphthalene, divinyl anthracene, and divinyl phenanthrene; polyfunctional polymerizable (meth)acrylate derivatives such as ethylene glycol di(meth)acrylate, diethylene glycol (meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, 1,3-butylene glycol di(meth)acrylate, 1,4-butanediol di(meth)acrylate, 1,6-hexanediol di(meth)acrylate, neopentyl glycol di(meth)acrylate, tris(2-hydroxyethyl) isocyanulate tri(meth)acrylate, pentaerythritol tetra(meth)acrylate, pentaerythritol tri(meth)acrylate, dipentaerythritol penta(meth)acrylate, trimethylol propane tri(meth)acrylate, ditrimethylol propane tetra(meth)acrylate, glycerol di(meth)acrylate, tetramethyl tri(meth)acrylate, and tetramethyl tetra(meth)acrylate; polyfunctional polymerizable (meth)acryl amide derivatives such as N, N'-methylene bis((meth)acrylamide), and N, N'-ethylene bis((meth)acrylamide); polyfunctional polymerizable allyl derivatives such as diethylene glycol diallyl ether, diallyl chlorendate, diallyl phthalate, diallyl hexahydrophthalate, and triallyl trimellitate. Of these one or more members may be used.

As the optional monomer (dx), there are cited, for instance, monomers of olefins such as ethylene, propylene, butylene, pentene, hexene, heptene, octene, cyclopentene, and cyclohexene; halogenated olefins such as vinyl fluoride, vinylidene fluoride, trifluoroethylene, tetrafluoroethylene, vinylchloride, vinylidene chloride, vinylene chloride, and vinyl bromide; alkyldienes such as butadiene, isoprene, and cyclopentadiene; aryl alkenes such as styrene, methylstyrene, ethylstyrene, propylstyrene, butylstyrene, pentylstyrene, vinylnaphthalene, methyl vinylnaphthalene, ethyl vinylnaphthalene, propyl vinylnaphthalene, butyl vinylnaphthalene, pentyl vinylnaphthalene, hexyl vinylnaphthalene, vinylanthracene, methyl vinylanthracene, ethyl vinylanthracene, propyl vinylanthracene, butyl vinylanthracene, pentyl vinylanthracene, hexyl vinylanthracene, vinylphenanthrene, methyl vinylphenanthrene, ethyl vinyl phenanthrene, propyl vinylphenanthrene, butyl vinylphenanthrene, pentyl vinylphenanthrene, hexyl vinylphenanthrene, fluorostyrene, chlorostyrene, bromostyrene, dichlorostyrene, trichlorostyrene, tetrachlorostyrene, chloromethyl styrene, hydroxymethyl styrene, aminomethyl styrene, chloro vinylnaphthalene, chloro vinylanthracene, and chloro vinylphenanthracene; the esters of (meth)acrylate such as methyl (meth)acrylate, ethyl (meth)acrylate, propyl (meth)acrylate, pentyl (meth)acrylate, hexyl (meth)acrylate, and hydroxyethyl (meth)acrylate; (meth)acrylamides such as (meth)acrylamide, and dimethyl(meth)acrylamide; vinyl ethers such as methylvinyl ether, ethylvinyl ether, butylvinyl ether, pentylvinyl ether, and hexylvinyl ether; vinyl esters such as vinyl acetate, vinyltrifluoro acetate, and vinylpentafluoro propionate; polymerizable substituted allyls such as allyl acetate, allyl acetonitrile, allylalcohol, allylamine, diallyl acetate, triallylamine, allylcyanide, diallylether, allylethyl ethers and allyltolyl ether; fumaric esters such as dimethyl fumarate, diethyl fumarate, dibutyl fumarate, diphenyl fumarate, and diamyl fumarate; the maleic esters such as dimethyl maleate, diethyl maleate, dipropyl maleate, dibutyl maleate, diamyl maleate, and diphenyl maleate; unsaturated aldehydes such as (meth)acrolein, chloro(meth)acrolein, and crotonic aldehyde; unsaturated ketones such as methylvinyl ketone, and ethylvinyl ketone; unsaturated lactams such as vinyl pyrrolidone; unsaturated amines such as dimethylvinyl amine, and diethylvinyl amine; unsaturated nitrils such as (meth)acrylonitrile, and cyanovinylidine. Of these one or more members may be used.

The ratio of the silicone macromer (am): the alkylene oxide chain-containing macromer (bm-1): the crosslinking monomer (cx) having two more double bonds therein: the optional monomer (dx) in the monomer mixture (X) is preferably, by weight, 10–89.9%: 10–89.9%: 0.1–50%: 0–79.9%, providing the sum of the components used is 100%.

In producing the cross-linked polymer by method (1-1), the monomer mixture (X) may be precipitation-polymerized using a known radical generating catalyst.

The meaning of precipitation-polymerization of method (1-1) is that the monomer mixture (X) dissolved together in an organic solvent, and then polymerized using a radical generating catalyst to give rise to a cross-linked polymer insoluble in the solvent. In method (1-1), an alcohol solvent is preferably used. After polymerization, a post treatment may be carried out such as re-preparation, solvent replacement, solvent distillation, drying, or grinding. In particular, when the solvent used in the polymerization is replaced with the silicone element containing insulating oil to form a dispersion of the composite polymer of the present invention, the workability for regulating the electrorheological fluids is improved.

Composite

The composite is composed of a particle substantially insoluble in the insulating liquid and a polysiloxane-containing polymer having the siloxane component-containing structural unit (A) and the dielectric particle-adsorbing chain-containing structural unit (B). The structural unit (A) is preferable to be the polysiloxane-containing unit (A-1). The structural unit (B) is preferable to be at least one member selected the group consisting the alkylene oxide chain-containing structural unit (B-1), the nitrogen atom-containing structural unit (B-2), and the hydrocarbon chain-containing structural unit (B-3) mentioned above. By causing a suitable interaction between the dielectric particles and the insulating liquid through the medium of this composite, the electrorheological fluid can be endowed with dispersion stability, redispersibility, and fluidity.

The composite possesses a moiety of the particle which are substantially insoluble in the insulating liquid. The composite itself, therefore, is substantially insoluble in the insulating liquid. Since the composite is substantially insoluble in the liquid, the mutual contact of the dielectric particles can be obstructed in the electrorheological fluid and the electrorheological fluid can be endowed with highly satisfactory redispersibility and fluidity. If the composite is soluble substantially in the insulating liquid, the produced electrorheological fluid will be possibly at a disadvantage in being incapable of acquiring redispersibility and fluidity.

The particle substantially insoluble in the insulating liquid has no particular restriction except for the requirement that it should be substantially insoluble in the insulating liquid. As typical examples of the particle, organic particle such as of polystyrene, poly(meth)acrylate, polyacrylonitrile, phenol resin, benzoguanamine resin, and melamine resin; inorganic particles such as of silica and alumina organic or inorganic particles having such condensation or addition reaction groups as hydroxyl group, amino group, carboxyl group, epoxy group, and isocyanate group; and organic or inorganic particles having such polymerization reaction groups as styryl group and (meth)acryloyl group may be cited.

The composite possesses the polysiloxane-containing polymer moiety having the silicone component-containing structural unit (A) and the dielectric particle-adsorbing chain-containing structural unit (B) as essential components thereof. Due to the structural unit (A), a suitable interaction can be caused between the composite and the insulating liquid to endow the electrorheological fluid with dispersion stability and fluidity. If the composite possesses no structural unit (A), the electrorheological fluid will be possibly at a disadvantage in encountering degradation of dispersion stability and fluidity. Due to the structural unit (B), a suitable interaction can be caused between the composite and the dielectric particles to impart dispersion stability to the electrorheological fluid. If the composite possesses no structural unit (B), the electrorheological fluid will be possibly at a disadvantage in encountering degradation of dispersion stability.

The ratio of the polysiloxane-containing polymer to the particle substantially insoluble in the insulating liquid in the composite is preferable to be such that the proportion of the polymer is in the range of 0.1 to 100 parts by weight, particularly preferably 1 to 10 parts by weight, based on 100 parts by weight of the particle. If the proportion of the polymer is less than 0.1 part by weight, the electrorheological fluid will be possibly at a disadvantage in being endowed with no dispersion stability. If the proportion of the polymer exceeds 100 parts by weight, the electrorheologlcal fluid will be possibly at a disadvantage in being endowed with neither redispersibility nor fluidity.

The composite is composed of the particle substantially insoluble in the insulating liquid and the polysiloxane-containing polymer. It is not particularly limited by the form of the compositing. The composite, however, is desired to be such that the polymer has been fixed on the surface of the particle in consequence of the compositing. If the polymer has not been fixed on the surface of the particle by the compositing, the electrorheological fluid will be possibly at a disadvantage in being endowed with no dispersion stability.

The composite is preferable to be such that the particle substantially insoluble in the insulating liquid is linked to the polysiloxane-containing polymer by a chemical bonding. The composite which serves as an ideal composite polymer in this invention is easily obtained by linking the particle to the polymer by a chemical bonding. If the particle is not linked to the polymer by a chemical bonding, the composite will possibly fail to serve as an ideal composite polymer in this invention.

The method for obtaining the composite has no particular restriction. For example, (i) a method which comprises forming the particle in the presence of the polymer thereby simultaneously effecting formation of the particle and the compositing, (ii) a method which comprises forming the polymer in the presence of the particle thereby simultaneously effecting formation of the polymer and the compositing, and (iii) a method which comprises synthesizing the particle and the polymer independently of each other, mixing or kneading them, and then subjecting the resultant mixture to a treatment with heat or radiation thereby effecting the compositing are available.

When the compositing method (i) is adopted, the composite is synthesized, for example, by (i-1) a method which comprises polymerization of a monomer mixture (Y) thereby forming the Polysiloxane-containing polymer and dispersion polymerization of a polymerizable monomer mixture ($\alpha$) capable of producing the particle in the presence of the polymer, (i-2) a method which comprises polymerization of the monomer mixture (Y) thereby forming the polysiloxane-containing polymer and emulsion polymerization of the polymerizable monomer mixture ($\alpha$) in an aqueous medium in the presence of the polymer, (i-3) a method which comprises polymerization of the monomer mixture (Y) thereby forming the polysiloxane-containing polymer and solusion polymerization of the polynerizable monomer mixture ($\alpha$) in the presence of the polymer. Particularly, the method of (i-1) and the method of (i-2) are used advantageously in respect that the composite having the polymer fixed on the surface of the particle by the complexing is easily obtained with high repeatability. In the operation of the method of (i-1), it is particularly desirable to use the polymer which has an ethylenically unsaturated group therein in advance because this polymer allows the composite having the polymer fixed on the surface of the particle by a chemical bonding to be easily obtained with high repeatability.

When the compositing method of (ii) is adopted, the composite is synthesized, for example, by (ii-1) a method which adopts a very minute organic or inorganic particle mentioned above as the particle and produces the polysiloxane-containing polymer by polymerizing the monomer mixture (Y) in the presence of the very minute organic or inorganic particle, (ii-2) a method which adopts a very minute organic or inorganic particle having the condensation or addition reaction group mentioned above as the particle and produces the polymer by polymerizing the monomer mixture (Y) in the presence of the very minute organic or inorganic particle, or (ii-3) a method which adopts a very minute organic or inorganic particles having the polymerization reaction group mentioned above therein as the particle and produces the polymer by polymerizing the monomer mixture (Y) in the presence of the very minute organic or inorganic particle. It is particularly advantageous to use the method of (ii-2) or the method of (ii-3) because it permits production of the composite having the polymer fixed on the surface of the particle by a chemical bonding. The adoption of the method of (ii-3) proves to be particularly desirable because the composite having the polymer fixed on the surface of the particle by a chemical bonding is easily obtained with high repeatability.

When the compositing method of (iii) is adopted, the composite is synthesized, for example, by (iii-1) a method which comprises mixing or kneading the particle with the polysiloxane-containing polymer in the presence or absence of a solvent.

Method (i-1)

The process for synthesizing the composite by the methodof (i-1) will be shown below.

The polysiloxane-containing polymer is obtained by polymerizing a monomer mixture (Y) containing a silicone macromer (am) represented by the general formula (8):

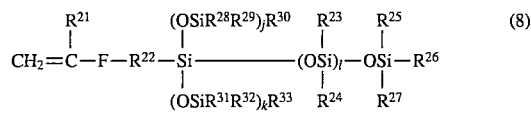

wherein F is —COO— or phenylene group, $R^{21}$ is hydrogen atom or methyl group, $R^{22}$ is an alkylene group of 1 to 6 carbon atoms, $R^{23}$ to $R^{33}$ are independently an aryl group, an alkyl group of 1 to 6 carbon atoms, or an alkoxy group of 1 to 10 carbon atoms, j and k are independently an integer in the range of 0 to 10, and l is an integer in the range of 0 to 200, and at least one dielectric particle-adsorbing chain-containing monomer (b) selected from the group consisting of an alkylene oxide chain-containing macromer (bm-1) represented by the general formula (9):

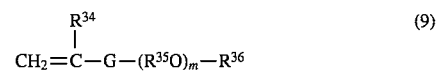

wherein G is —COO— or phenylene group, $R^{34}$ is hydrogen atom or methyl group, $R^{35}$ is an alkylene group of 2 to 4 carbon atoms, $R^{36}$ is hydrogen atom or an alkyl group, and m is an integer in the range of 2 to 100, a nitrogen atom-containing monomer (b-2) represented by the general formula (10):

wherein J is

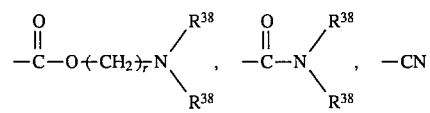

or a nitrogen-containing heterocycle-containing substituent, $R^{37}$ is hydrogen atom or methyl group, $R^{38}$ is hydrogen atom or an alkyl group, and r is an integer in the range of 2 to 6, and a hydrocarbon chain-containing monomer (b-3) represented by the general formula (11):

wherein K is —COO— or phenylene group, $R^{39}$ is hydrogen atom or methyl group and $R^{40}$ is an alkyl group of 4 to 30 carbon atoms, as essential components and an optional monomer (dy).

The ratio of the silicone macromer (am) is preferably 10–90%, and more preferably 20–80% by weight, based on the weight of the monomer mixture (Y). If the ratio of the silicone macromer (am) is less than 10% by weight or more than 90% by weight, the electrorheological fluid does not have dispersion stability and fluidity. The ratio of the dielectric particle-adsorbing chain-containing monomer (b) is preferably 10–90%, and more preferably 20–80% by weight, based on the weight of the monomer mixture (Y). If the ratio of the monomer (b) is less than 10% by weight or more than 90% by weight, the electrorheological fluid does not have full dispersion stability.

When the method of (i-1) is adapted, as the silicone macromer (am), there are cited, for instance, (meth)acryloyl group-containing polydimethyl siloxane, styryl group-containing polydimethyl siloxane, (meth)acryloyl group-containing and partially octyl substituted polydimethyl siloxane, styryl group-containing and partially octyl substituted polydimethyl siloxane, (meth)acryloyl group-containing and partially phenyl substituted polydimethyl siloxane, tris(trimethylsiloxy) silylpropyl (meth)acrylate. Of these one or more members may be used.

As the alkylene oxide chain-containing macromer (bm-1), used as the dielectric particle-adsorbing chain-containing monomer (b), there are cited, for instance, a polyalkylene glycol having a double bond such as a (meth)acryloyl group-containing polyethylene glycol, a styryl group-containing polyethylene glycol, a p-isopropenyl benzyl group-containing polyethylene glycol, a (meth)acryloyl group-containing polypropylene glycol, a styryl group-containing polypropylene glycol, a p-isopropenyl benzyl group-containing polypropylene glycol, a (meth)acryloyl group-containing polytetramethylene glycol, a styryl group-containing polytetramethylene glycol, and a p-isopropenyl benzyl group-containing polytetramethylene glycol. Of these one or more members may be used.

As a nitrogen atom-containing monomer (b-2), there are cited monomers including one or more basic nitrogen atoms and an ethylenically unsaturated bond. Examples of nitrogen atom-containing monomer (b-2) are, but not limited to, nitrogen-containing (meth)acrylic acid derivatives, (meth)acrylonitrile, and unsaturated monomers containing a nitrogen heterocyclic ring.

As the nitrogen-containing (meth)acrylic acid derivatives, there are cited, for instance, modified (meth)acrylic esters in which the ester portion includes a substituted or non substituted amino group, and (meth)acrylic acid amide, preferably aminoalkyl (meth)acrylate and (meth)acrylic acid amide. Examples of aminoalkyl (meth)acrylate are N, N-dimethyl amino ethyl (meth)acrylate, N, N-diethyl amino ethyl (meth)acrylate, N, N-dimethyl amino propyl (meth)acrylate, and N, N-dimethyl amino butyl (meth)acrylate or the like. Examples of (meth)acrylic acid amide are (meth)acrylamide, N-(meth)acrylamide, N-ethyl (meth)acrylamide, N-butyl (meth)acrylamide, N, N-dimethyl (meth)acrylamide, N, N-diethyl (meth)acrylamide, N, N-dimethyl propyl acrylamide or the like. Of these one or more members may be used, and in particular preferably a tertiary amine containing compound.

As the unsaturated monomers containing a nitrogen heterocyclic ring, there are cited, for instance, monomers in which a hetrocyclic ring made of a single ring or multiple rings including one to three, preferably one or two nitrogen atoms, bonds to a vinyl group. Examples of these monomers are vinyl pyrrolidones such as 2-vinyl-2-pyrrolidone, and 1-vinyl-3-pyrrolidone; vinyl pyridines such as 2-vinyl pyridine, 4-vinyl pyridine, and 5-methyl-2-vinyl pyridine; vinylimidazoles such as 1-vinyl imidazole, and 1-vinyl-2-methyl imidazole; N-(meth)acryloyl morpholine or N-(meth)acryloyl pyridine or the like. Of these one or more members may be used.

As the hydrocarbon chain-containing monomer (b-3), there are cited, for instance, (meth)acrylic esters such as methyl (meth)acrylate, ethyl (meth)acrylate, butyl (meth) acrylate, octyl (meth)acrylate, 2-ethylhexyl (meth)acrylate, dodecyl (meth)acrylate, cetyl (meth)acrylate, stearyl (meth) acrylate, 2-methylstearyl (meth)acrylate, and eicosyl (meth) acrylate; or alkyl group substituted styrenes such as methyl styrene, ethyl styrene, butyl styrene, octyl styrene, dodecyl styrene, and stearyl styrene. Of these one or more members may be used.

As the optional monomer (dy), there are cited, for instance, polymerizable monomers of olefins such as ethylene, propylene, and cyclohexene; alkyldienes such as butadiene, isoprene, and cyclopentadiene; halogenated olefins such as vinyl fluoride, vinylidene fluoride, vinyl chloride, and vinylidene chloride; aromatic vinyl compounds such as styrene, α-methyl styrene, p-methyl styrene, vinyl naphthalene, vinyl anthracene, chlorostyrene, and chloromethyl styrene; (meth)acrylic alkoxy alkyl esters such as methoxy ethyl (meth)acrylate; (meth)acrylic hydroxyl alkyl esters such as 2-hydroxyl ethyl (meth)acrylate, and hydroxyl butyl (meth)acrylate; esters made from an aromatic alcohol and (meth)acrylate such as benzyl (meth)acrylate; composite polymers of glycidyl (meth)acrylate or (meth)acrylic hydroxy alkyl ester and a monocarboxylic acid having 2–18 carbon atoms such as acetic acid, propionic acid, lauric acid, linoleic acid, and p-tert-benzoic acid; fluorine-containing compounds such as VISCOAT8F, VISCOAT8FM (products, (meth)acrylates containing a fluorine atom, sold by Osaka Organic Chemical Industry Ltd. in Japan), (meth)acrylic perfluoro cyclohexyl, and perfluoro cyclohexyl ethylene; vinyl esters such as vinyl benzoate; polymerizable unsaturated group-containing sulfonic acids such as vinyl sulfonic acid, allyl sulfonic acid, styrene sulfonic acid, 2-acrylamide-2-methyl propane sulfonic acid, 2-sulfoethyl (meth)acrylate, and 3-sulfopropyl (meth)acrylate; or polymerizable unsaturated group-containing carboxylic acid such as acrylic acid, methacrylic acid, crotonic acid, itaconic acid, maleic acid, fumaric acid, and citraconic acid or salts thereof, the salt being sodium, calcium, ammonium, and pyridinium or the like.

The polysiloxane-containing polymer is produced by a known procedure, e.g. solution polymerization using a radical generating catalyst.

As the radical generating catalyst, there are cited, for instance, conventional catalysts for the polymerization of vinyl monomers. Examples of the radical generating catalyst are, but not limited to, azo compounds such as 2, 2'-azobisisobutyronitrile, and 2, 2'-azobis (2, 4-dimethylvaleronitrile); and per-oxide compounds such as benzoyl peroxide, di-tert-butyl peroxide, tert-butyl peroctate, and tert-butylperoxy-2-ethylhexanoate. The amount of the radical generating catalyst to be added is usually 0.2–10 parts by weight, preferably 0.5–5 parts by weight, based on 100 parts of the monomer used.

The reaction temperature of polymerization is usually 60°–100° C. for 1 to 15 hours.

In the solution polymerization, a solvent may be used. Examples of the solvent are, but not limited to, aliphatic hydrocarbons such as hexane, heptane, and octane; aromatic hydrocarbons benzene, toluene, and xylene; alcohols such as isopropyl alcohol, and butanol; ketones such as methyl isobutyl ketone, and methyl ethyl ketone; esters such as ethyl acetate, isobutyl acetate, amyl acetate, 2-ethyl hexyl acetate; and Cellosolve such as methyl cellosolve, and ethyl cellosolve.

After finishing the polymerization, the solution of the polymer thus obtained can be used for synthesizing the composite or can be used after separating the polymer by distilling off the solvent.

The polysiloxane-containing polymer preferably has an ethylenically unsaturated group, which is introduced by the reaction of a monomer with an ethylenically unsaturated group.

When the polymer having an ethylenically unsaturated group is used for synthesizing the composite, due to the formation of chemical bond between the particle produced by polymerising a polymerizable monomer mixture ($\alpha$) and the polymer, then the electrorheological fluids have improved the dispersion stability during storage and the dispersion stability after the use for a long period time under conditions of high shear stress.

The introduction of an ethylenically unsaturated group into the polymer is carried out, for instance, by adopting, as a component of a monomer mixture, an acid group-containing monomer such as acrylic acid, methacrylic acid, maleic acid, and vinyl sulfonic acid to form the precursor of the polymer, and then reacting with the acid group of the precursor a glycidyl group-containing unsaturated monomer such as glycidyl (meth)acrylate or allyl glycidyl ether.

The composite is produced by dispersion-polymerizing a polymerizable monomer mixture ($\alpha$) in the presence of the polysiloxane-containing polymer in the method (i-1). The meaning of dispersion polymerization of the method (i-1) is polymerization carried out in the presence of a dispersion stabilizing agent using an organic solvent capable of dissolving the polymerizable monomer mixture ($\alpha$) and not capable of dissolving the resultant polymer. In particular, the organic solvent is capable of dissolving both of the siloxane-containing polymer and the polymerizable monomer mixture ($\alpha$) and substantially not capable of dissolving the resultant composite. Examples of the organic solvent are, but not limited to, aliphatic hydrocarbons such as hexane, heptane, and octane; aromatic hydrocarbons such as benzene, toluene, and xylene; alcohols such as methyl alcohol, ethyl alcohol, isopropyl alcohol, and n-butyl alcohol; ethers such as cellosolve, butylcellosolve, and diethylene glycol monobutyl ether; esters such as ethyl acetate, and isobutyl acetate; and ketones and the like. Of these one or more members may be used.

The polymerizable monomer mixture ($\alpha$) can contain known monomers. For instance, aromatic compounds such as styrene, vinyl toluene, vinyl p-chlorotoluene, and vinyl pyridine; and (meth)acrylic acid esters such as methyl (meth)acrylate, ethyl (meth)acrylate, propyl (meth)acrylate, and benzyl (meth)acrylate can be cited.

The dispersion polymerization for synthesizing the composite to be used in the method (i-1), is carried out usually using a radical generating catalyst. Examples of the radical generating catalyst are, but not limited to, azo compounds such as 2, 2'-azobisisobutyronitrile, and 2, 2'-azobis( 2,4-dimethylvaleronitrile); and peroxides such as benzoyl peroxide, and lauroyl peroxide. The amount of the catalyst is usually 0.2–10 parts by weight, preferably 0.5–5 parts by weight, based on 100 parts by weight of the polymerizable monomer mixture ($\alpha$).

The proportion of the silicone-containing polymer is preferably 0.1–10 parts by weight, more preferably 1–6 parts by weight, to 100 parts by weight of the polymerizable monomer mixture ($\alpha$) in the method (i-1). If the proportion of the polymer is not more than 0.1 part by weight, the polymerization for producing the composite are not reproducible and if obtained, the dispersion stability of electrorheological fluid is poor. Adversely, if the proportion is not less than the 10 parts by weight, the resultant electrorheological fluid is liable to be poor in re-distensibility and fluidity properties.

The total concentration of the polymerizable monomer mixture ($\alpha$) and the silicone-containing polymer in the reaction mixture is usually 5–50% by weight, preferably 10–30% by weight. Further, a conventional surfactant or a dispersion stabilizer may be added.

The dispersion polymerization may be carried out usually at 60°–100° C. and for 0.5–30 hours. After polymerization, a post treatment may be carried out for solvent replacement, solvent distillation, drying, and grinding. When the polymerization solvent used is replaced with a silicone insulating oil, the workability of producing electrorheological fluid is improved.

Method (i-2)

Process for synthesizing the composite by the method (i-2) is shown as follows.

The composite used in the method (i-2) is obtained by emulsion-polymerizing the polymerizable monomer mixture ($\alpha$) in a medium mainly comprising water in the presence of the silicone-containing polymer. The emulsion polymerization is preferred using a radical generating catalyst soluble in water. The radical generating catalyst is a conventional one for emulsion polymerization of vinyl monomers. Examples of the radical generating catalyst are, but not limited to, sodium persulfate, potassium persulfate, ammonium persulfate, 4, 4'-azobis-4-cyanovaleric acid, and 2, 2'-azobis-aminopropane hydrochloric acid salt.

In the method (i-2) the proportion of the silicone-containing polymer is preferably 0.1–10 parts by weight, more preferably 1–6 parts by weight, based on 100 parts by weight of the polymerizable monomer mixture ($\alpha$) used. If the proportion is not more than 0.1 part by weight, the polymerization for producing the composite is reproducible, and the if obtained electrorheological fluid does not have a sufficient dispersion stability. Adversely, if the proportion is not less than 10 parts by weight, the electrorheological fluid has poor redispersibility and fluidity.

The total concentration of the polymerizable monomer mixture ($\alpha$) and the siloxane-containing polymer is preferably 5–50% by weight, more preferably 10–30% by weight, based on the weight of the aqueous solvent used.

The emulsion-polymerization for synthesizing the composite by the method (i-2) can be carried out in water or in an aqueous medium comprizing water and an organic solvent. As the organic solvent, there are an organic solvent having a high affinity to water, e.g. alcohols such as methanol, ethanol, and isopropanol; Cellosolve such as methylcellosolve, and ethylcellosolve; glycols such as ethylene glycol, and diethylene glycol. When the mixture is used as the solvent, it is preferred for the polymerizable monomer mixture ($\alpha$) not to dissolve into the solvent.

The polymerization for synthesizing the composite in the method (t-2) may be carried out at 50°–100° C. for 2–40 hours.

The procedure of polymerization is carried out by charging water and an emulsifier into a reactor, mixing the resultant mixture to form an uniform solution, adding a part or whole of the polymerizable monomer mixture ($\alpha$) into the solution, regulating the temperature of the emulsion, and adding a radical generating catalyst into the regulated emulsion to start polymerization. The polymerization is carried out in the emulsified state at a prescribed temperature by adding the residual polymerizable monomer mixture (α), if present. After polymerization, a post treatment may be carried out for solvent replacement, solvent distillation, drying and grinding.

Method (ii-3)

Process for synthesizing the composite by the method (ii-3) is shown as follows.

As the particle substantially insoluble in the insulating liquid used in the method (ii-3), a very minute organic or inorganic particle having the polymerizable reactive group can be used. The particle can be obtained by treating the organic or inorganic fine particle with a compound (e) having both functional groups capable of reacting with the functional group existed on the surface of the particle and the polymerizable reactive group. Examples of compound (e) are vinyl group-containing silane coupling agents such as g-(meth)acryloxy propyl trimethoxy silane, vinyl trimethoxy silane, vinyl triethoxy silane, and vinyl trichloro silane; and glycidyl group-containing unsaturated compounds such as glycidyl (meth)acrylate, and allyl glycidyl ether.

The amount of compound (e) is usually 10–100 parts by weight, based on 100 parts by weight of the organic or inorganic particle used.

The polymerization of the monomer mixture (Y) for producing the composite by the method (ii-3) may be carried out using a polymerization initiator in the presence of the particle in an organic solvent.

Examples of the organic solvent are, but not limited to, aliphatic hydrocarbons such as hexane, heptane, and octane; aromatic hydrocarbons such as benzene, toluene, and xylene; alcohols such as methyl alcohol, ethyl alcohol, isopropyl alcohol, and n-butyl alcohol; ethers such as methyl cellosolve, ethyl cellosolve, butyl cellosolve, diethylene glycol monobutyl ether; esters such as ethyl acetate, and isobutyl acetate; and ketones. Of these one or more members may be used.

The polymerization initiator may be peroxide initiators such as benzoyl peroxide, and lauroyl peroxide; azo initiators such as 2, 2'-azobisisobutyronitrile, 2, 2'-azobis (2, 4'-dimethyl valeronitrile).

The mentioned polymerization may be carried out at 50°–100° C. for 0.5–15 hours. After polymerization, a post treatment may be carried out for solvent replacement, solvent distillation, drying and grinding.

The other matters and compounds not explained are the same as described in method (i-1).

The electrorheological fluid of the present invention may be produced by dispersing the dielectric particles with the insulating liquid in the presence of the composite polymer. The ratio of the dielectric particles to the insulating liquid is preferably 100 parts by weight: 50–500 parts by weight. If the ratio is not less than 500, the electrorheological fluid has the disadvantage in that the generating shear stress when an electric field is applied, does not increase. Adversely, if the ratio is not more than 50, the electrorheological fluid has poor fluidity properties.

EXAMPLE

The present invention is explained in more detail with reference to the following examples, but the aspect of the present invention is not defined by those examples.

Synthetic Example 1

150 g of toluene, 1 g of azobisisobutyronitrile, 50 g of methacryloyl group containing polydimethyl siloxane "Sairapurehn FM0721" (a product of Chisso Corporation having an average molecular weight of about 5,000 and marked under trademark designation of Sairapurehn FM 0721), and 50 g of methacryloyl group-containing methoxy polyethylene glycol "NK ester M-230G" (a product of Shinnakamura Kagaku Kogyo K.K. and marketed under trademark designation of NK Either M230G) were charged into a 500 ml, four necked flask equipped with a stirrer, a reflux condenser, a thermometer and a nitrogen gas introducing port. With the introduction of nitrogen gas, stirring was carried out at room temperature for 30 minutes. Polymerization was carried out by heating the mixture at 80° C. for two hours. After polymerization, the reaction solution was subjected to a heat treatment using an evaporator under a reduced pressure to remove the solvent used to give rise to an oily polysiloxane-containing polymer (hereinafter referred to as "polymer (1)").

350 g of isopropyl alcohol, 2.5 g of polymer (1), 1.5 g of azobisisobutyronitrile, and 50 g of styrene as the polymerizable monomer (α) were charged into a 500 ml, four necked flask equipped with a stirrer, a reflux condenser, a thermometer, and a nitrogen gas introducing port. With the introduction of nitrogen gas, stirring continued at room temperature for 30 minutes. Polymerization was carried out at 70° C. for 24 hours. To the reaction solution, was added 200 g of silicone oil "KF 96-20cs" (a product sold by Shin-etsu Chemical Industry Co., Ltd. and marked under product code of "KF96-20cs). The resultant mixture was subjected to a heat treatment using an evaporator under a reduced pressure to remove the volatiles and to give rise to a silicone oil dispersion of composite polymer (1) (having composite polymer (1) content of 20% by weight; hereinafter referred to as "additive dispersion (1)").

Synthetic Example 2

150 g of toluene, 1 g of azobisisobutyronitrile, 40 g of methacryloyl group-containing polydimethyl siloxane "Sairapurehn FM0721", and 60 g of dodecyl methacrylate were charged into a 500 ml, four necked flask equipped with a stirrer, a reflux condenser, a thermometer, and a nitrogen gas introducing port. Stirring was carried out for 30 minutes while a nitrogen gas was introduced. Polymerization was carried out at 75° C. for three hours. After polymerization, the solvent used was removed by heat treatment using an evaporator under a reduced pressure to give rise to oily polymer (2).

350 g of isopropyl alcohol, 2 g of polymer (2), 1 g azobisisobutyronitrile, and 50 g of styrene as polymerizable monomer (α) were charged into a 500 ml, four necked flask equipped with a stirrer, a reflux condenser, a thermometer, and a nitrogen gas introducing port. Stirring was carried out at room temperature for 30 minutes while a nitrogen gas was introduced. Polymerization was carried out at 70° C. for 15 hours. To the reaction solution, were charged 200 g of silicone oil "KF 96-20cs" (supra), and the resultant mixture was subjected to heat treatment using an evaporator under a reduced pressure to remove the volatiles to give rise to a silicone oil dispersion of composite polymer (2) (having composite polymer (2) content of 20% by weight; hereinafter referred to as "additive dispersion (2)").

Synthetic Example 3

200 g of toluene, 1 g of benzoyl peroxide, 60 g of tris(trimethylsiloxy) silylpropyl methacrylate (a product, under the tradename of X-22-5002, sold by Shin-etsu Chemical Industry Co., Ltd. in Japan; average molecular weight of about 422)30 g of butyl acrylate, and 10 g of styrene were charged into a 500 ml, four necked flask equipped with a stirrer, a reflux condenser, a thermometer, and a nitrogen gas introducing port. With the introduction of nitrogen gas, stirring was carried out at room temperature for 30 minutes. Polymerization was carried out at 70° C. for 24 hours. After polymerization, the solvent used was distilled out by heating using an evaporator under a reduced pressure to give rise to oily polymer (3).

350 g of hexane, 2.5 g of polymer (3), 1 g of azobisisobutyronitrile, 40 g of methyl methacrylate, and 10 g of benzyl methacrylate as polymerizable monomer (α) were charged into a 500 ml, four necked flask equipped with a stirrer, a reflux condenser, a thermometer, and a nitrogen gas introducing port. With the introduction of nitrogen gas, stirring was carried out at room temperature for 30 minutes. Polymerization was carried out at 70° C. for 20 hours. To the resultant reaction solution, were added 200 g of silicone oil "KF 96-20cs" (supra). The resultant mixture was reduced using an evaporator to vaporize the volatile components to give rise a silicone dispersion of composite polymer (3) (having composite polymer (3) content of 20% by weight; hereinafter referred to as "additive dispersion (3)").

Synthetic Example 4

200 g of toluene, 3 g of azobisisobutyronitrile, 50 g of methacryloyl group-containing polydimethyl siloxane "Sairapurehn FM0721" (supra), 45 g of dodecyl methacrylate, and 5 g of methacrylic acid were charged into a 500 ml, four necked flask equipped with a stirrer, a reflux condenser, a thermometer, and a nitrogen gas introduction port. While introducing nitrogen gas, stirring was carried out at room temperature for 30 minutes. Polymerization was carried out at 80° C. for two hours. After the further addition of 5 g of glycidyl methacrylate and 1 g dimethylaminoethanol, reaction was carried out at 100° C. for 5 hours. After reaction, the used solvent was heated using an evaporator under a reduced pressure to give rise to oily polymer (4).

350 g of isopropyl alcohol, 2 g of polymer (4), 2 g of azobisisobutyronitrile, and 50 g of styrene as polymerizable monomer (α) were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 70° C. for 24 hours. After the addition of 200 g of silicone oil "KF 96-20cs" (supra) into the reaction solution, the volatile components were removed by heating with an evaporator under a reduced pressure to give rise to a silicone oil dispersion of composite polymer (4) (having composite polymer (4) content of 20% by weight; hereinafter referred to as "additive dispersion (4)").

Synthetic Example 5

200 g of toluene, 3 g of azobisisobutyronitrile, 50 g of methacryloyl group-containing polydimethyl siloxane "Sairapurehn FM0721" (supra), and 50 g of diethylaminoethyl methacrylate were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 70° C. for 3 hours. After polymerization, the used solvent was removed by heating using an evaporator under a reduced pressure to give rise to oily polymer (5).

350 g of isopropyl alcohol, 2 g of polymer (5), 2 g of azobisisobutyronitrile, and 50 g of styrene as polymerizable monomer (α) were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 70° C. for 24 hours. After the addition of 200 g of silicone oil "KF 96-20cs" (supra) into the reaction mixture, the volatile components were removed by heating using an evaporator under a reduced pressure to give rise to a silicone oil dispersion of composite polymer (5) (having composite polymer (5) content of 20% by weight; hereinafter referred to as "additive dispersion (5)").

Synthetic Example 6

100 ml of toluene, 0.5 g of azobisisobutyronitrile, 10 g of methacryloyl group-containing polydimethyl siloxane "Sairapurehn FM0721" (supra), 30 g of methacryloyl group-containing methoxy polyethylene glycol "NK ester M-230G" and 10 g of dimethylaminoethyl methacrylate. Polymerization was carried out at 70° C. for 5 hours. After the reaction, the resultant solution was subjected to heating using an evaporator under a reduced pressure to give rise to oily polymer (6).

480 ml of water, and 6.4 g of polymer (6) were charged into a 1 liter, four necked flask equipped with a biomixer, a reflux condenser, and a thermometer to dissolve, and to which was added a mixture of 120 g of methyl methacrylate as the polymerizable monomer (α) and 3 g of azobisisobutyronitrile. The content of the flask was then dispersed using the dispersing device at 20,000 r.p.m. Polymerization was carried out at 70° C. for 8 hours. After polymerization, the used solvent of water was replaced with isopropyl alcohol by azeotropic distillation. To the resultant solution, was added 488 g of electric insulating oil containing mineral hydrocarbon as the main component "a high voltage insulating oil" (a product of Cosmo Oil Co., Ltd. in Japan). The volatile components were removed using an evaporator under a reduced pressure to give rise to an electric insulating oil dispersion of composite polymer (6) (having composite polymer (6) content of 20% by weight; hereinafter referred to as "additive dispersion (6)").

Synthetic Example 7

In a four-neck flask having an inner volume of 500 ml and provided with a stirrer, a reflux condenser, a thermometer, and a nitrogen inlet tube, 150 g of toluene, 1 g of azo-bis-isobutyronitrile, 50 g of methacryloyl group-containing polydimethyl siloxane "Sairapurehn FM0781", and 50 g of cetyl methacrylate were placed and stirred at room temperature for 30 minutes as kept swept meanwhile with nitrogen gas. The resultant mixture was heated at 75° C. for three hours to be polymerized. After the reaction was completed, the reaction solution was heated in an evaporator under a reduced pressure to expel the solvent and obtain oily polymer (7).

In a four-neck flask having an inner volume of 500 ml and provided with a stirrer, a reflux condenser, a thermometer, and a nitrogen inlet tube, 350 g of isopropyl alcohol, 2 g of polymer (7), 2 g of azo-bis-isobutyronitrile, and 50 g of styrene were placed and stirred at room temperature for 30 minutes as kept swept meanwhile with nitrogen gas. The resultant mixture was heated at 70° C. for 24 hours to be polymerized. The reaction solution, with 200 g of silicone "KF96-20cs" added dropwise thereto, was dried in an evaporator under a reduced pressure to expel a volatile component by distillation and obtain a silicone oil dispersion of composite polymer (7) of a styrene type graft polymer having composite polymer (7) content of 20% by weight (hereinafter referred to as "additive dispersion (7)").

Synthetic Example 8

In a four-neck flask having an inner volume of 500 ml and provided with a stirrer, a reflux condenser, a thermometer, and a nitrogen inlet tube, 150 g of toluene, 1 g of benzoyl peroxide, 40 g of methacryloyl group-containing methoxy poly(ethylene glycol) having an average molecular weight of about 1,100 "NK Ester M230G", and 60 g of methacryloyl group-containing polydimethyl siloxane "Sairapurehn FM0721" were placed and stirred at room temperature for 30 minutes as kept swept meanwhile with nitrogen gas. The resultant mixture was heated at 75° C. for three hour to be polymerized. After the reaction was completed, the resultant reaction solution was heated in an evaporator under a reduced pressure to expel the solvent by distillation and obtain oily polymer (8) having an average molecular weight of 70,000.

In a four-neck flask having an inner volume of 500 ml and provided with a stirrer, a reflux condenser, a thermometer, and a nitrogen inlet tube, 350 g of isopropyl alcohol, 2 g of polymer (8), 2 g of benzoyl peroxide, and 50 g of styrene were placed and stirred at room temperature for 30 minutes as kept swept meanwhile with nitrogen gas. The resultant mixture was heated at 70° C. for 24 hours to be polymerized. The reaction solution, with 200 g of a silicone oil "KT96-20cs" added dropwise thereto, was dried in an evaporator under reduced pressure to expel the volatile component by distillation and obtain a silicone oil dispersion of composite polymer (8) having the polymer (8) joined.

Synthetic Example 9

In a four-neck flask having an inner volume of 500 ml and provided with a stirrer, a reflux condenser, a thermometer, and a nitrogen inlet tube, 150 g of toluene, 1 g of azo-bis-isobutyronitrile, 50 g of methacryloyl group-containing polydimethyl siloxane "Sairapurehn FM0721", and 50 g of stearyl methacrylate were placed and stirred at room temperature for 30 minutes as kept swept meanwhile with nitrogen gas. The resultant mixture was heated at 80° C. for 2 hours to be polymerized. After the reaction was completed, the reaction solution consequently obtained was heated in an evaporator under reduced pressure to expel the solvent by distillation and obtain oily polymer (9).

In a four-neck flask having an inner volume of 500 ml and provided with a stirrer, a reflux condenser, a thermometer, and a nitrogen inlet tube, 350 g of isopropyl alcohol, 2.5 g of polymer (9), 1.5 g of azo-bis-isobutyronitrile, and 50 g of styrene as a polymerizable monomer ($\alpha$) were placed and stirred at room temperature for 30 minutes as kept swept meanwhile with nitrogen gas. The resultant mixture was heated at 70° C. for 24 hours to be polymerized. The reaction solution, with 200 g of a silicone oil "KF96-20cs" (supra) added dropwise thereto, was dried in an evaporator under a reduced pressure to expel a volatile component by distillation and obtain a silicone oil dispersion of composite polymer (9) (composite polymer (9) content 20% by weight; hereinafter referred to as "additive dispersion (9)").

Synthetic Example 10

In a four-neck flask having an inner volume of 500 ml and provided with a stirrer, a reflux condenser, a thermometer, and a nitrogen inlet tube, 200 g of toluene, 1 g of benzoyl peroxide, 60 g of methacryloyl group-containing polydimethyl siloxane "Sairapurehn FM0725" (a product of Chisso Coprporation having an average molecular weight about 10,000 and marked under trademark designation of Sairapurehn FM0725) and 40 g of dodecyl styrene were placed and stirred at room temperature for 30 minutes as kept swept meanwhile with nitrogen gas. The resultant mixture was heated at 75° C. for 20 hours to be polymerized. After the reaction was completed, the reaction solution consequently obtained was heated in an evaporator under a reduced pressure to expel the solvent by distillation and obtain oily polymer (10).

In a four-neck flask having an inner volume of 500 ml and provided with a stirrer, a reflux condenser, a thermometer, and a nitrogen inlet tube, 350 g of isopropyl alcohol, 1.5 g of polymer (10), 2 g of benzoyl peroxide, and 50 g of styrene as a polymerizable monomer ($\alpha$) were placed and stirred at room temperature for 30 minutes as kept swept meanwhile with nitrogen gas. The resultant mixture was heated at 75° C. for 20 hours to be polymerized. The reaction solution, with 200 g of a silicone oil "KF96-20cs" added dropwise thereto, was dried in an evaporator under reduced pressure to expel the volatile component by distillation and obtain a silicone oil dispersion of composite polymer (10) (composite polymer (10) content 20% by weight; hereinafter referred to as "additive dispersion (10)").

Synthetic Example 11

In a four-neck flask having an inner volume of 500 ml and provided with a stirrer, a reflux condenser, a thermometer, and a nitrogen inlet tube, 200 g of toluene, 1 g of benzoyl peroxide, 65 g of tris(trimethyl siloxy)silylpropyl methacrylate having an average molecular weight of about 422 "X-22-5002" 25 g of dodecyl acrylate and 10 g of acrylonitrile were placed and stirred at room temperature for 30 minutes as kept swept meanwhile with nitrogen gas, The resultant mixture was heated at 70° C. for 24 hours to be polymerized. After the reaction was completed, the reaction solution consequently obtained was heated in an evaporator under a reduced pressure to expel the solvent by distillation and obtain oily polymer (11), In a four-neck flask having an inner volume of 500 ml and provided with a stirrer, a reflux condenser, a thermometer, and a nitrogen inlet tube, 350 g of hexane, 2.5 g of the polymer (11), 1 g of azo-bis-isobutyronitrile, 40 g of methyl methacrylate as a polymerizable monomer ($\alpha$), and 10 g of benzyl methacrylate were placed and stirred at room temperature for 30 minutes as kept swept meanwhile with nitrogen gas. The resultant mixture was heated at 70° C. for 20 hours to be polymerized. The reaction solution, with 200 g of a silicone oil "KF96-20cs" added dropwise thereto, was dried in an evaporator under a reduced pressure to expel the volatile component by distillation and obtain a silicone oil dispersion of composite polymer (11) (composite polymer (11) content 20% by weight; hereinafter referred to as "additive dispersion (11)").

Synthetic Example 12

In a four-neck flask having an inner volume of 500 ml and provided with a stirrer, a reflux condenser, a thermometer, and a nitrogen inlet tube, 150 g of toluene, 1 g of azo-bis-isobutyronitrile, 50 g of methacryloyl group-containing polydimethyl siloxane "Sairapurehn FM0721", 45 g of dodecyl methacrylate, and 5 g of methacrylic acid were placed and stirred at room temperature for 30 minutes as kept swept meanwhile with nitrogen gas. The resultant mixture was heated at 80° C. for 2 hours to be polymerized. It was further left reacting with 5 g of glycidyl methacrylate and 1 g of dimethyl amino ethanol at 100° C. for 5 hours. After the reaction was completed, the reaction solution consequently obtained was heated in an evaporator under a reduced pressure to expel the solvent by distillation and obtain oily polymer (12).

In a four-neck flask having an inner volume of 500 ml and provided with a stirrer, a reflux condenser, a thermometer, and a nitrogen inlet tube, 350 g of isopropyl alcohol, 2.5 g of the polymer (12), 1.5 g of azo-bis-isobutyronitrile, and 50 g of styrene as a polymerizable monomer ($\alpha$) were placed and stirred at room temperature for 30 minutes as kept swept meanwhile with nitrogen gas. The resultant mixture was heated at 70° C. for 24 hours to be polymerized. The reaction solution, with 200 g of a silicone oil "KF96-20cs" added dropwise thereto, was dried in an evaporator under reduced pressure to expel the volatile component by distillation and obtain a silicone oil dispersion of composite polymer (12) (composite polymer (12) content 20% by weight; hereinafter referred to as "additive dispersion (12)").

Synthetic Example 13

150 ml of methanol, 50 ml of deionized water, and 10 g of Spherical silica fine particle (a truly fine particle sold by Nippon Shokubai Co., Ltd.; average particle diameter=1 mm) were charged into a 300 ml flask. Further the addition of 5 g of γ-(methacryloxy propyl) trimethoxy silane, reaction was carried out at 40° C. for 2 hours to introduce the methacryloyl group onto the surface of the spherical silica fine particle. The resultant mixture was subjected to a reduced distillation of the used solvent using an evaporator, and then dried at 50° C. using a vacuum dryer. 15 g of the resultant product, and 150 ml of toluene were charged into a 200 ml flask to disperse the resultant product. To the dispersion, were added 0.1 g of azobisisobutyronitrile, 0.75 g of methacryloyl group-containing polydimethyl siloxane "Sairapurehn FM0721", and 0.75 g of methacryloyl group-containing methoxy polyethylene glycol "NK ester M-230G". The reaction was carried out at 70° C. for 5 hours. To the reaction solution, was added 66 g of silicone oil "KF 96-20cs". The volatile components were distilled out under a reduced pressure using an evaporator to give rise to a silicone oil dispersion of composite polymer (13) (having composite content polymer (13) of 20% by weight; hereinafter referred to as "additive dispersion (13)").

Synthetic Example 14

150 ml of methanol, 50 ml of deionized water, and 10 g of Spherical silica fine particle (average particle diameter 1 mm) were charged into a 300 ml flask to disperse the Spherical silica fine particle. Further the addition of 5 g of γ-(methacryloxy propyl) trimethoxy silane, reaction was carried out at 40° C. for 2 hours to introduce the methacryloyl group onto the surface of the Spherical silica fine particle. The mixture was then treated using an evaporator to distillate out the used solvent, and dried at 50° C. with a vacuum dryer. 15 g of the resultant product, and 150 ml of toluene were charged into a 200 ml flask to form a dispersion. To the dispersion, were added 0.1 g of azobisisobutyronitrile, 0.6 g of methacryloyl group-containing polydimethyl siloxane "Sairapurehn FM0721", and 0.9 g of dodecyl methacrylate. The reaction was carried out at 70° C. for 5 hours. After the addition of 66 g of silicone oil "KF 96-20cs", the volatile components were distilled out under a reduced pressure to give rise to a silicone oil dispersion of composite polymer (14) (having composite polymer (14) of 20% by weight' hereinafter referred to as "additive dispersion (14)").

Synthetic Example 15

To a 1 liter, four necked, separable flask equipped with a biomixer, a reflux condenser and a thermometer, were charged 480 ml of water, and 6.4 g of Poval PVA-205 (a polyvinyl alcohol sold by Kuraray Co., Ltd. in Japan) to dissolve, and then additionally added a mixture of 110 g of methyl methacrylate, 10 g of Industrial divinyl benzene, and 3 g of azobisisobutyronitrile. The content in the flask was dispersed using the dispersion device at 20,000 r.p.m. and polymerization was carried out at 70° C. for 8 hours. The resultant solids were separated, thoroughly washed with water, and dried using a hot air dryer at 80° C. for 12 hours to give rise to a 115 g of a spherical, polymerized, crosslinked fine particle.

100 g of the above mentioned spherical, polymerized, crosslinked fine particle and 400 g of methanol solution containing 10% by weight of sodium hydroxide were charged into a 1 liter, three necked, separable flask to disperse. The reaction mixture was heated to 70° C., maintained at the same temperature for 24 hours while stirring to saponify. The saponified mixture was then filtered, and washed with water. The resultant solid was dispersed in a 50.0 ml of 2N hydrochloric acid solution, and then thoroughly washed with water. The washed material was dried using a vacuum dryer at 80° C. for 10 hours to give rise to 95 g of a carboxylic acid-containing polymerized particle insoluble in silicone insulating oil and having an average particle diameter of 2 mm.

10 g of the resultant carboxylic acid-containing polymerized particle and 150 ml of toluene were charged into a 300 ml of flask to form a dispersion. To the dispersion, ware additionally added 5 g of glycidyl methacrylate and 0.75 g of dimethylaminoethyl methacrylate. The reaction was carried out at 40° C. for 5 hours to adhere the methacryloyl group to the surface of the polymerized particle. To the solution, were added 0.1 g of azobisisobutyronitrile, 0.75 g of methacryloyl group-containing polydimethyl siloxane "Sairapurehn FM0721", 0.75 g of diethylaminoethyl methacrylate and 0.5 g of stearyl methacrylate. Polymerization was carried out at 70° C. for 5 hours. To the reaction solution, were added 68 g of silicone oil "KF 96- 20cs". The resultant mixture was distilled in a reduced pressure using an evaporator to give rise to a silicone oil dispersion of composite polymer (15) (having composite polymer (15) content of 20% by weight; hereinafter referred to as "additive dispersion (15)").

Synthetic Example 16

150 ml of toluene were charged into a 300 ml flask, to which was added 10 g of carboxylic acid group-containing polymer particle obtained in Synthetic Example 15 to form a dispersion. To the dispersion, were added 5 g of glycidyl methacrylate and 0.75 g of dimethylaminoethyl methacrylate. Polymerization was carried out at 40° C. for 5 hours allowing the methacryloyl group to introduce to the surface of the polymer particle. To the reaction solution, were added 0.1 g of azobisisobutyronitrile, 0.75 g of methacryloyl group-containing polydimethyl siloxane "Sairapurehn FM0721", and 0.5 g of 1-vinyl-2-pyrrodinone. The reaction was carried out at 70° C. for 5 hours. After the addition of 68 g of silicone oil "KF 96-20cs" into the reaction solution, the volatile components were removed using an evaporator under a reduced pressure to give rise to a silicone oil dispersion of composite polymer (16) (having composite polymer (16) of 20% by weight; hereinafter referred to as "additive dispersion (16)").

Synthetic Example 17

480 ml of water, and 6.4 g of Poval-205 were charged into a 1 liter, four necked flask equipped with a dispersion device, a reflux condenser, and a thermometer to dissolve, to which was added a mixture of 110 g of methyl methacrylate, 10 g of Industrial divinyl benzene and 3 g of azobisisobutyronitrile. The content of the flask was dispersed using the dispersion device at 20,000 r.p.m. Polymerization was carried out at 70° C. for 8 hours. The resultant solid was filtered, washed with water, and dried using a hot air dryer at 80° C. for 12 hours to give rise to 115 g of spherical, polymerized crosslinked fine particle.

100 g of the spherical, polymerized crosslinked fine particle and 400 g of a methanol solution containing 10% by weight of sodium hydroxide were charged into a 1 liter, three necked flask equipped with a stirrer and a thermometer to form a uniform dispersion. The reaction mixture was heated to 70° C., and maintained at the same temperature with stirring for 24 hours to saponify. The reaction mixture was filtered, and washed with water. The resultant solid was dispersed in 500 ml of 2N hydrochloric acid, and then thoroughly washed with water. The washed solid was dried using a vacuum dryer at 80° C. for 10 hours to give rise to 95 g of a carboxylic acid group-containing polymer particle insoluble in an electric insulating oil containing mainly hydrocarbons and having an average particle diameter of 2 mm.

10 g of the resultant carboxylic acid group-containing polymer particle and 150 ml of toluene were charged into a 300 ml flask to form a dispersion and to which were added 5 g of glycidyl methacrylate. The reaction was carried out at 40° C. for 5 hours to allow the methacryloyl group to adhere to the surface of the polymer particles. To the resultant reaction solution, were added 0.1 g of azobisisobutyronitrile, 0.75 g of dimethylaminoethyl methacrylate and 1.0 g of methacryloyl group-containing polydimethyl siloxane "Sairapurehn FM0721" to be dissolved. The reaction was carried out 70° C. for 5 hours. After the addition of 68 g of electric insulating oil containing mainly mineral hydrocarbon and having a viscosity of 10 cs, the resultant solution was subjected to distillation using an evaporator under a reduced pressure to remove the volatile components to give rise to an electric insulating oil dispersion of composite polymer (17) (having composite polymer (17) content of 20% by weight); hereinafter referred to as "additive dispersion (17)").

Synthetic Example 18

In a flask having an inner volume of 300 ml, 200 ml of methanol and 100 ml of deionized water were mixed and 100 g of truly spherical fine particles of silica gel having an average particle diameter of 1.5 μm (produced by Nippon Shokubai Co., Ltd.) were dispersed in the resultant mixture. Further 7 g of γ-methacryloxypropyl trimethoxy silane was added thereto, the reaction was carried out at 70° C. for one hour. The resultant reaction mixture was heated to expel the solvent. The reaction product consequently obtained was dried under a reduced pressure at 60° C.

In a flask having an inner volume of 500 ml, 300 ml of toluene was placed and 100 g of the reaction product obtained after the drying mentioned above was dispersed. The dispersion and 1 g of azo-bis-isobutyronitrile, 5 g of methacryloyl group-containing polydimethyl siloxane "Sairapurehn FM0721", and 3 g of hexyl methacrylate dissolved therein were left reacting at 70° C. for 5 hours. After the reaction was completed, the resultant reaction solution was heated under a reduced pressure to expel the solvent by distillation and obtain composite polymer (18) formed of minute surface-treated particles of silica gel.

Synthetic Example 19

In a flask having an inner volume of 300 ml, 200 ml of methanol and 100 ml of deionized water were mixed and 100 g of fine truly spherical silica gel particles having an average particle diameter of 1.5 μm (produced by Nippon Shokubai Co., Ltd.) were dispersed in the resultant mixture. The dispersion and 7 g of γ-methacryloxypropyl trimethoxy silane added thereto were left reacting at 70° C. for one hour. The reaction solution were heated to expel the solvent by distillation. The reaction product consequently obtained was dried at 60° C. under reduced pressure.

In a flask having an inner volume of 500 ml, 300 ml of toluene was placed and 100 g of the reaction product obtained in a dry state was dispersed in the toluene. The resultant dispersion and 1 g of azo-bis-isobutyronitrile, 5 g of methacryloyl group-containing polydimethyl siloxane "Sairapurehn FM0721", and 5 g of butyl methacrylate dissolved therein were left reacting at 70° C. for 5 hours. After the reaction was completed, the reaction solution was heated under a reduced pressure to expel the solvent by distillation and obtain composite polymer (19) having a polymer of an average molecular weight of 25,000 fixed on the surface of minute silica gel particles.

Synthetic Example 20

In a flask having an inner volume of 300 ml, 200 ml of methanol and 100 ml of deionized water were mixed and 100 g of fine truly spherical silica gel particles having an average particle diameter of 1.5 μm (produced by Nippon Shokubai Co., Ltd.) were dispersed in the resultant mixture. The dispersion and 7 g of γ-methacryloxypropyl trimethoxy silane added thereto were left reacting at 70° C. for one hour. The reaction solution were heated to expel the solvent by distillation. The reaction product consequently obtained was dried at 60° C. under a reduced pressure.

In a flask having an inner volume of 500 ml, 300 ml of toluene was placed and 100 g of the reaction product obtained in a dry state was dispersed in the toluene. The resultant dispersion and 1 g of azo-bis-isobutyronitrile, 5 g of methacryloyl group-containing polydimethyl siloxane "Sairapurehn FM0721", and 5 g of dimethylaminoethyl methacrylate dissolved therein were left reacting at 70° C. for 5 hours. After the reaction was completed, the reaction solution was heated under a reduced pressure to expel the solvent by distillation and obtain composite polymer (20) having a polymer of an average molecular weight of 25,000 fixed on the surface of minute silica gel particles.

Synthetic Example 21

In a flask having an inner volume of 300 ml, 150 ml of methanol and 50 ml of deionized water were placed and 10 g of truly spherical silica particles having an average particle diameter of 1 μm (produced by Nippon Shokubai Co., Ltd.) were dispersed in the aqueous methanol solution. The dispersion and 5 g of γ-(methacryloxypropyl)trimethoxy silane added thereto were left reacting at 40° C. for two hours to introduce the methacryloyl group to the surface of the spherical silica particles. Then, the solvent was distilled off in vacuo in an evaporator and it was dried at 50° C. by using a vacuum drier to obtain the reaction product. Then, in a flask having an inner volume of 200 ml, 150 ml of toluene was placed and 15 g of the reaction product obtained as described above was dispersed. The dispersion and 0.1 g of azo-bis-isobutyronitrile, 0.6 g of methacryloyl group-containing polydimethyl siloxane "Sairapurehn FM0721" and 0.9 g of dodecyl methacrylate solved in the dispersion were left reacting at 70° C. for five hours. The resultant reaction solution, with 66 g of silicone oil "KF96-20cs" added dropwise thereto, was heated in an evaporator under a reduced pressure to expel a volatile component by distillation and obtain a silicone oil dispersion of composite polymer (21) (composite polymer (21) content 20% by weight; hereinafter referred to as "additive dispersion (21)").

Synthetic Example 22

In a four-neck separable flask having an inner volume of 1 liter and provided with a stirrer, a reflux condenser, and a thermometer, 480 ml of water was placed, 6.4 g of polyvinyl alcohol was dissolved in the water, and a mixture consisting of 110 g of methyl methacrylate, 10 g of industrial grade divinyl benzene, and 3 g of azo-bis-isobutyronitrile was added to the aqueous solution. Then, the contents of the flask were dispersed by stirring at a rate of 20,000 rpm by use of a dispersing device and left polymerizing at 70° C. for 8 hours. The solid product consequently obtained was separated by filtration, thoroughly washed with water, and then dried at 80° C. for 12 hours by use of a hot air drier, to obtain 115 g of minute spherical cross-linked polymer particles.

Then, in a three-neck separable flask having an inner volume of 1 liter and provided with a stirrer and a thermometer, 100 g of the minute cross-linked polymer particles were placed and the particles and 400 g of a methanol 10 wt % sodium hydroxide solution added thereto were stirred until they were uniformly dispersed. The resultant mixture was heated to 70° C. and then stirred at this temperature for 24 hours to be saponified. Then, the reaction mixture was separated by filtration and washed with water. The solid product consequently obtained was dispersed in 500 ml of 2N hydrochloric acid and then washed thoroughly with water. The wet solid product was dried at 80° C. for 10 hours by use of a vacuum drier to obtain 95 g of carboxylic acid group-containing polymer particles having an average particle diameter of 2 μm and insoluble in a silicone-containing insulating oil.

In a flask having an inner volume of 300 ml, 150 ml of toluene was placed and 10 g of the carboxylic acid group-containing polymer particles synthesized above were dispersed. The resultant dispersion and 5 g of glycidyl methacrylate and 0.75 g of dimethylaminoethyl methacrylate added thereto were left reacting at 40° C. for 5 hours to introduce the methacryloyl group to the surface of the polymer particles. The resultant mixture and 0.1 g of azo-bis-isobutyronitrile, 0.75 g of methacryloyl group-containing polydimethyl siloxane "Silaplain FM0721", and 0.5 g of stearyl methacrylate dissolved therein were left reacting at 70° C. for 5 hours. The resultant reaction solution, with 68 g of silicone oil "KF96-20cs" added dropwise thereto, was dried in an evaporator under a reduced pressure to expel the volatile component and obtain a silicone oil dispersion of composite polymer (22) (composite polymer (22) content 20% by weight; hereinafter referred to as "additive dispersion (22)").

Synthetic Example 23

400 g of tetrahydrofuran, 20 g of methacryloyl group-containing polydimethyl siloxane "Sairapurehn FM0721", 20 g of diethylaminoethyl methacrylate, 1 g of azobisisobutyronitrile, and 100 g of deionized water containing 10% by weight of sodium styrene sulfonate were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 75° C. for 3 hours. After polymerization, the used solvent was removed by heating using an evaporator under a reduced pressure to give rise to polymer (23).

200 g of deionized water, 2 g of polymer (23), 1 g of sodium persulfate, and 40 g of styrene as polymerizable monomer (α) were charged into a 500 ml, four necked flask equipped with a stirrer, a reflux condenser, a thermometer, and a nitrogen gas introducing port. While introducing nitrogen gas, stirring was carried out at 20,000 r.p.m. for 2 minutes. The stirred mixture was heated at 70° C. for 3 hours and further at 90° C. for 3 hours to polymerize. After polymerization, the used solvent of water was changed to isopropyl alcohol by azeotropic distillation. After the addition of 200 g of Electric insulating oil containing mineral hydrocarbon as the main component "a high voltage insulating oil" into the resultant mixture, the isopropyl alcohol used as the solvent was removed under a reduced pressure to give rise to a mineral electric insulating dispersion of composite polymer (23) being made from a polystyrene composite (having composite polymer (23) content of 20% by weight; hereinafter referred to as "additive dispersion (23)").

Synthetic Example 24

200 g of tetrahydrofuran, 20 g of methacryloyl group-containing polydimethyl siloxane "Sairapurehn FM0721", 20 g of acrylonitrile, 5 g of methacrylic acid and 5 g of glycidyl methacrylate, 1 g of azobisisobutyronitrile, and 150 g of deionized water containing 10% by weight of sodium 2-acrylamide-2-methyl propane sulfonate were charged into a 500 ml, four necked flask equipped with a stirrer, a reflux condenser, a thermometer, and a nitrogen gas introducing port. While introducing nitrogen gas, stirring was carried out at room temperature for 30 minutes. Polymerization was carried out at 75° C. for 3 hours. After polymerization, the volatile components were removed by heating using an evaporator to give rise to polymer (24).

200 g of deionized water, 2 g of polymer (24), 1 g of sodium persulfate, and 50 g of methyl methacrylate as polymerizable monomer (α) were charged into a 500 ml, four necked flak equipped with a stirrer, a reflux condenser, a thermometer, and a nitrogen gas introducing port. While introducing nitrogen gas, stirring was carried out at 20,000 r.p.m. using the dispersing device for 2 minutes. The resultant mixture was heated at 70° C. for 3 hours, and further heated at 90° C. for 3 hours to polymerize. After polymerization, the used solvent of water was changed to isopropyl alcohol by azeotropic distillation. To the resultant mixture, was charged 200 g of Electric insulating oil containing mineral hydrocarbon as the main component "high voltage insulating oil". The isopropyl alcohol was removed under a reduced pressure to give rise to a mineral electric insulating oil dispersion of composite polymer (24) being made of a poly methylmethacrylate (having composite polymer (24) content of 20% by weight; hereinafter referred to as "additive dispersion (24)").

Synthetic Example 25

In a four-neck flask having an inner volume of 500 ml and provided with a stirrer, a reflux condenser, a thermometer, and a nitrogen inlet tube, 200 g of deionized water, 1 g of polyoxyethylene alkylstyryl ether (a reactive emulsifier produced by Dai-ichi Kogyo Seiyaku Co., Ltd. and marketed under trademark designation of "Acharon RN-20"), 1 g of dodecyl methacrylate, and 1 g of sodium persulfate were placed and dissolved. In the resultant solution, the monomer mixture consisting of 50 g of methyl methacrylate and 5 g of industrial grade divinyl benzene (a mixture of 55% by weight of divinyl benzene, 35% by weight of ethyl styrene, etc.; produced by Wako Pure Chemical Industries, Ltd.) was stirred at 20,000 r.p.m. by use of a dispersing device for two minutes as kept swept meanwhile with nitrogen gas. The resultant mixture was heated at 70° C. for 3 hours and further heated at 90° C. for 3 hours to be polymerized. After the polymerization was completed, the reaction solution was subjected to azeotropic distillation to displace water with isopropyl alcohol as the dispersive medium. The distillate, Electric insulating oil containing numeral hydrocarbon as the main component "high voltage insulating oil" added thereto, was distilled under a reduced pressure to expel isopropyl alcohol and obtain a mineral type electrical insulating oil dispersion of composite polymer (25) formed of microgel of a methyl methacrylate type cross-linked polymer having composite polymer (25) content of 20% by weight (hereinafter referred to as "additive dispersion (25)).

Synthetic Example 26

In a 1,000 ml, four-necked flask provided with a stirrer, a reflux condenser, a thermometer, and a nitrogen gas introducing port, 567 g of isopropyl alcohol, 6 g of azo-bis-isobutyronitrile, 10 g of methacryloyl group-containing methoxy poly(ethylene glycol) "NK ester M-230G", 20 g of Industrial divinyl benzene, 30 g of methacryloyl group-containing poly(dimethyl siloxane) "Sairapurehn FM0721", and 40 g of were placed and stirred at a room temperature for 30 minutes and kept swept with nitrogen. The resultant mixture was subjected to a polymerization reaction by 20 hours' heating at 65° C. and four hour's heating at 83° C. By the determination of the non-volatile content of the produced reaction solution, the conversion of the monomer was found to be 100%. A silicone oil dispersion of composite polymer (26) (having composite polymer (26) content of 20% by weight; hereinafter referred to as "additive dispersion (26)") was obtained by adding dropwise 400 g of silicone oil "KF96-20cs" to the reaction solution and heating the produced mixture under a reduced pressure in an evaporator thereby expelling the volatile content by distillation.

Synthetic Example 27

567 g of isopropyl alcohol, 5 g of azobisisobutyronitrile, 60 g of methacryloyl group-containing polydimethyl siloxane "Sairapurehn FM0725", 30 g of methacryloyl group-containing polyethylene glycol polytetra ethylene glycol (a product sold under the trade name of "Burenmah 55PET-800" by Nippon Oils & Fats Co., Ltd., an average molecular weight of about 900), and 10 g of Industrial divinyl benzene were charged into a 1,000 ml, four necked flask equipped with a stirrer, reflux condenser, a thermometer, and a nitrogen gas introducing port. With the introduction of nitrogen gas, stirring was carried out at room temperature for 30 minutes. After heating to 65° C., additional heating continued for 20 hours, and then continued at 83° C. for four hours to carry out polymerization.

To the reaction solution, were added 392 g of silicone oil "KF 96-20 cs". The resultant mixture was subjected to a heat treatment using an evaporator under a reduced pressure to remove the volatile and to give rise to a silicone oil dispersion of composite polymer (27) (having composite polymer (27) content of 20% by weight; hereinafter being referred to as "additive dispersion (27)").

Example 1

24.0 g of Poval "PVA-205" was charged into a 3 liter, four necked separable flask equipped with a stirrer, a reflux condenser, and a thermometer and dissolved in 1.2 liter of water, to which were added a mixture of 405 g of styrene, 45 g of Industrial divinyl benzene and 12 g of azobisisobutyronitrile. Stirring was carried out at 7,000 r.p.m. and polymerization was carried out at 80° C. for 8 hours. The resultant solid was filtered, thoroughly washed with water, and dried using a hot air dryer at 80° C. for 12 hours to give rise to 435 g of a spherical polymer cross-linked polymer (hereinafter referred to as "cross-linked polymer (1)").

400 g of the resultant cross-linked polymer (1) and 3,000 g of 98 wt % sulfuric acid were charged into a 2 liter, four necked separable flask equipped with a stirrer, a thermometer, and a dropping funnel to form a dispersion. The reaction mixture was heated to 80° C., and maintained at the same temperature with stirring For 24 hours to saponify. The resultant reaction mixture was poured into water at 0° C., filtered, and washed with water. The solid obtained was neutralized with 2,000 ml of an aqueous 10% by weight sodium hydroxide solution, and thoroughly washed with water. The washed solid was dried using a vacuum dryer at 80° C. for 10 hours to give rise to 700 g of a sulfonic group-containing polystyrene polymer particle having an average particle diameter of 6 mm (hereinafter referred to as "dispersed phase particle (1)"). The dispersed phase particle (1) had an anionic dissolution group density of 4.2 mg equivalent/g.

30 g of dispersed phase particle (1) was dried at 150° C. for 3 hours, and then the water content thereof was regulated to 2.0% by weight by allowing dispersed phase particle (1) to absorb moisture in the atmosphere. After regulation, dispersed phase particle (1) was dispersed in a dispersing medium which was produced by adding 4 g of additive dispersion (1) into 66 g of silicone oil "KF 96- 20cs" (supra) to give rise to an electrorheological fluid (1).

Example 2

The procedure of Example 3 was repeated, except that 3 g of additive dispersion (2) obtained in Synthetic Example 2 was used instead of additive dispersion (2), and 67 g of silicone oil "KF 96-10cs" (supra) was used instead of silicone oil "KF 96-20cs" (supra), to give rise to an electrorheological fluid (2).

Example 3

The procedure of Example 3 was repeated, except that 7 g of additive dispersion (3) obtained in Synthetic Example 3 was used instead of additive dispersion (3), and the amount of silicone oil "KF 96-20cs" (supra) was changed to 63 g, to give rise to an electrorheological fluid (3).

Example 4

16.0 g of Poval "PVA-205" (supra) was charged into a 3 liter, four necked separable flask equipped with a stirrer, a reflux condenser, and a thermometer and dissolved in 1.2 liter of water, to which was added a mixture of 270 g of styrene, 30 g of Industrial divinyl benzene (supra), and 8 g of azobisisobutyronitrile. Stirring was carried out at 20,000 r.p.m. and polymerization at 80° C. for 8 hours. The resultant solid was filtered, washed with water, and dried using a hot air dryer at 80° C. for 12 hours to give rise to 93 g of a spherical cross-linked polymer (2) (hereinafter referred to as "cross-linked polymer (2)").

100 g of cross-linked polymer (2) and 700 g of 98 wt % concentrated sulfuric acid were charged into a 2 liter, four necked flask equipped with a stirrer, a thermometer, and a dropping funnel to form a dispersion. The mixture was heated to 80° C., and maintained at the same temperature with stirring for 24 hours to saponify. The reaction mixture was poured into water at 0° C., filtered, and washed with water. The obtained solid was neutralized with 500 ml of an aqueous 10% by weight of sodium hydroxide solution, and then thoroughly washed with water. The washed solid was dried using a vacuum dryer at 80° C. for 10 hours to give rise to 173 g of a sulfonic acid group-containing polystyrene polymer particle having an average particle diameter of 2.5 mm (hereinafter referred to as "dispersed phase particle (2)"). Dispersed phase particle (2) has an anionic dissolution group density of 4.1 mg equivalent/g.

30 g of dispersed phase particle (2) was dried at 150° C. for 3 hours, and the water content regulated to 2.0% by weight by absorbing moisture in the atmosphere. After the regulation of the water content, dispersed phase particle (2) was dispersed in an insulating liquid in which 4 g of additive dispersion (4) were added into 66 g of silicone oil "KF 96-20cs" (supra), to give rise to an electrorheological fluid (4).

Example 5

The procedure of Example 4 was repeated, except that 4 g of additive dispersion (5) obtained in Synthetic Example 5 was used instead of additive dispersion (4), to give rise to an electrorheological fluid (5).

Example 6

The procedure of Example 1 was repeated, except that 4 g of additive dispersion (6) obtained in Synthetic Example 6 was used instead of additive dispersion (1), and 66 g of electric insulating oil containing mainly mineral hydrocarbon (supra) was used, to give rise to an electrorheological fluid (6).

Example 7

In a four-neck separable flask having an inner volume of 3 liters and provided with a stirrer, a reflux condenser, and a thermometer, 1.2 liters of water was placed, 16.0 g of polyvinyl alcohol was dissolved in the water, and then a mixture consisting of 270 g of styrene, 30 g of industrial grade divinyl benzene and 8 g of azo-bis-isobutyronitrile was added to the aqueous solution. Then, the contents of the flask were dispersed by stirring at a rate of 7,000 rpm and heated at 80° C. for 8 hours to be polymerized. The solid product consequently obtained was separated by filtration, thoroughly washed with water, and dried at 80° C. for 12 hours by use of a hot air drier to obtain 289 g of a cross-linked polymer in the shape of beads (hereinafter referred to as "cross-linked polymer (3)").

Then, in a four-neck separable flask having an inner volume of 2 liters and provided with a stirrer, a thermometer, and a dropping funnel, 100 g of the cross-linked polymer (3) and 700 g of concentrated sulfuric acid with an assay of 98% by weight were stirred until they formed a homogeneous dispersion. The reaction mixture was heated to 80° C. and then heated and stirred at the same temperature for 24 hours to undergo sulfonation. The reaction mixture was poured into water at 0° C., separated by filtration, and washed with water. The solid product which was consequently obtained was neutralized with 500 ml of an aqueous 10 wt % sodium hydroxide solution and thoroughly washed with water. The product was then dried at 80° C. for 10 hours by use of a vacuum drier to obtain 298 g of sulfonic acid group-containing polystyrene polymer particles having an average particle diameter of 6 μm (hereinafter referred to as "dispersed phase particles (3)"). The dispersed phase particles (3) were found to have an anion dissociating group density of 4.2 mg equivalent/g.

The amount 30 g of the dispersed phase particles (3) was dried at 150° C. for 3 hours, left absorbing the moisture in the air until the water content thereof reached 2.0% by weight, and uniformly dispersed in an insulating liquid prepared by adding 1 g of the additive dispersion (7) obtained in Synthetic Example 7 to 69 g of silicone oil "KF96-20cs" to produce an electrorheological fluid (7) of this invention.

Example 8

In a four-neck separable flask having an inner volume of 3 0liters and provided with a stirrer, a reflux condenser, and a thermometer, 1.2 liters of water was placed, 8.0 g of polyvinyl alcohol was dissolved in the water, and then a mixture consisting of 270 g of styrene, 30 g of industrial grade divinyl benzene and 8 g of azo-bis-isobutyronitrile was added to the aqueous solution. Then, the contents of the flask were dispersed by stirring at a rate of 8,000 rpm and left polymerizing at 80° C. for 8 hours. The solid product consequently obtained was separated by filtration, thoroughly washed with water, and dried at 80° C. for 12 hours by use of a hot air drier, to obtain 291 g of a cross-linked polymer of the shape of beads (hereinafter referred to as "cross-linked polymer (4)").

Then, in a four-neck separable flask having an inner volume of 2 liters and provided with a stirrer, a thermometer, and a dropping funnel, 100 g of the cross-linked polymer (4) was placed and the cross-linked polymer (4) and 700 g of concentrated sulfuric acid with an assay of 98% by weight added thereto were stirred until they formed a homogeneous dispersion. The resultant reaction mixture was heated to 80° C. and then heated and stirred at the same temperature to undergo sulfonation. Then, the reaction mixture was poured into water at 0° C., separated by filtration, and washed with water. The solid product consequently obtained was neutralized with 500 ml of an aqueous 10 wt % sodium hydroxide solution and then thoroughly washed with water. Then, the wet solid product was dried at 80° C. for 10 hours by use of a vacuum drier to obtain 180 g of sulfonic acid group-containing polystyrene type polymer particles having an average particle diameter of 5 μm (hereinafter referred to as "dispersed phase particles (4)"). The dispersed particles (4) were found to have an anion dissociating group density of 4.3 mg equivalent/g.

30 g of the disperse particles (4) was dried at 150° C. for 3 hours and left absorbing the moisture in the air until the water content thereof reached 2.0% by weight. An electrorheological fluid (8) of this invention was obtained by uniformly dispersing the dispersed phase particles (4) of the adjusted water content in the insulating liquid prepared by adding 4 g of the additive dispersion (8) to a mixture consisting of 16 g of a silicone oil "KF96-20cs" and 50 g of a fluorine element-containing oil (produced by Daikin Industries Co., Ltd. and marketed under trademark designation of "Daifloil #1").

Example 9

In a four-neck separable flask having an inner volume of 3 liters and provided with a stirrer, a reflux condenser, and a thermometer, 1.2 liters of water was placed, 16.0 g of polyvinyl alcohol was solved in the water, and then a mixture consisting of 270 g of styrene, 30 g of industrial grade divinyl benzene and 8 g of azo-bis-isobutyronitrile was added to the aqueous solution. Then, the contents of the flask were dispersed by stirring at a rate of 7,000 rpm and heated at 80° C. for 8 hours to be polymerized. The solid product consequently obtained was separated by filtration, thoroughly washed with water, and dried at 80° C. for 12 hours by use of a hot air drier to obtain 289 g of a cross-linked polymer in the shape of beads (hereinafter referred to as "cross-linked polymer (5)").

Then, in a four-neck separable flask having an inner volume of 2 liters and provided with a stirrer, a thermometer, and a dropping funnel, 200 g of the cross-linked polymer (5) and 1,400 g of concentrated sulfuric acid with an assay of 98% by weight were stirred until they formed a homogeneous dispersion. The reaction mixture was heated to 80° C. and then heated and stirred at the same temperature for 24 hours to undergo sulfonation. The reaction mixture was poured into water at 0° C., separated by filtration, and washed with water. The solid product which was consequently obtained was neutralized with 1,000 ml of an aqueous 10 wt % sodium hydroxide solution and thoroughly washed with water. The product was then dried at 80° C. for 10 hours by use of a vacuum drier to obtain 372 g of sulfonic acid group-containing polystyrene polymer particles having an average particle diameter of 6 μm (hereinafter referred to as "dispersed phase particles (5)"). The dispersed phase particles (5) were found to have an anion dissociating group density of 4.2 mg equivalent/g.

The amount 30 g of the dispersed phase particles (5) was dried at 150° C. for 3 hours, left absorbing the moisture in the air until the water content thereof reached 2.0% by weight, and uniformly dispersed in an insulating liquid prepared by adding 4 g of the additive dispersion (9) obtained in Synthetic Example 9 to 66 g of silicone oil "KF96-20cs" to produce an electrorheological fluid (9) of this invention.

Example 10

An electrorheological fluid (10) of this invention was obtained by following the procedure of Example 9 while using 5 g of the additive dispersion (10) obtained in Syn-

33 thetic Example 10 in the place of the additive polymer dispersion (9) and changing the amount of the silicone oil "KF96-20cs" to 65 g.

Example 11

An electrorheological fluid (11) of this invention was obtained by following the procedure of Example 9 while using 5 g of the additive dispersion (11) obtained in Synthetic Example 11 in the place of the additive polymer dispersion (9) and changing the amount of the silicone oil "KF96-20cs" to 65 g.

Example 12

An electrorheological fluid (12) of this invention was obtained by following the procedure of Example 9 while using 5 g of the additive dispersion (12) obtained in Synthetic Example 12 in the place of the additive dispersion (9) and changing the amount of the silicone oil "KF96-20cs" to 65 g.

Example 13

An electrorheological fluid (13) of this invention was obtained by drying 30 g of zeolite particles having an average particle diameter of 3 μm (produced by Sigma Corp. and marketed under trademark designation of "Zeolite"; hereinafter referred to as "dispersed phase particles (6)") at 150° C. for 3 hours, allowing the dried zeolite particles to absorb the moisture in the air until the water content thereof reached 10.0%, and uniformly dispersing the zeolite particles in an insulating liquid prepared by adding 4 g of the additive dispersion (9) obtained in Synthetic Example 9 to 66 g of silicone oil "KF96-20cs".

Example 14

The procedure of Example 1 was repeated, except that 4 g of additive dispersion (13) obtained in Synthetic Example 13 was used instead of additive dispersion (1), and 66 g of silicone oil "KF 96-20cs" (supra) was used, to give rise to an electrorheological fluid (14).

Example 15

The procedure of Example 1 was repeated, except that 4 g of additive dispersion (14) obtained in Synthetic Example 14 was used instead of additive dispersion (1), and 66 g of silicone oil "KF 96-20cs" (supra) was used, to give rise to an eleotrorheological fluid (15).

Example 16

The procedure of Example 1 was repeated, except that 4 g of additive dispersion (15) obtained in Synthetic Example 15 was used instead of additive dispersion (1), and 66 g of silicone oil "KF 96-20cs" (supra) was used, to give rise to an electrorheological fluid (16).

Example 17

The procedure of Example 1 was repeated, except that 4 g of additive dispersion (16) obtained in Synthetic Example 13 was used instead of additive dispersion (1), and 66 g of silicone oil "KF 96-20cs" (supra) was used, to give rise to an electrorheological fluid (17).

Example 18

The procedure of Example 3 was repeated, except that 4 g of additive dispersion (17) obtained in Synthetic Example 17 was used instead of additive dispersion (1), and 66 g of electric insulating oil containing mainly mineral hydrocarbon (supra) was used, to give rise to an electrorheological fluid (18).

Example 19

An electrorheological fluid (19) of this invention was obtained by following the procedure of Example 7 while using 0.5 g of the composite polymer (18) obtained in Synthetic Example 18 in the place of the additive dispersion (7) and a mixture of 19.5 g of a silicone oil "KF96-20cs" and 50 g of a fluorine element-containing oil "Daifloil #1" in the place of the silicone oil "KF96-20cs".

34

Example 20

An electrorheological fluid (20) of this invention was obtained by following the procedure of Example 8 while using 0.5 g of the composite polymer (19) obtained in Synthetic Example 19 in the place of the additive dispersion (8) and changing the amount of the silicone oil "KF96-20cs" to be used to 69.5 g.

Example 21

An electrorheological fluid (21) of this invention was obtained by following the procedure of Example 8 while using 0.5 g of the composite polymer (20) obtained in Synthetic Example 20 in the place of the additive dispersion (8) and changing the amount of the silicone oil "KF96-20cs" to be used to 69.5 g.

Example 22

In a four-neck separable flask having an inner volume of 3 liters and provided with a stirrer, a reflux condenser, and a thermometer, 1.2 liters of water was placed, 16.0 g of polyvinyl alcohol was solved in the water, and then a mixture comprising 270 g of styrene, 30 g of industrial grade divinyl benzene and 8 g of azo-bis-isobutyronitrile was added to the aqueous solution. Then, the contents of the flask were dispersed by stirring at a rate of 20,000 rpm and heated at 80° C. for 8 hours to be polymerized. The solid product consequently obtained was separated by filtration, thoroughly washed with water, and dried at 80° C. for 12 hours by use of a hot air drier to obtain 293 g of a cross-linked polymer in the shape of beads (hereinafter referred to as "cross-linked polymer (7)").

Then, in a four-neck separable flask having an inner volume of 2 liters and provided with a stirrer, a thermometer, and a dropping funnel, 100 g of the cross-linked polymer (7) and 700 g of concentrated sulfuric acid with an assay of 98% by weight were stirred until they formed a homogeneous dispersion. The reaction mixture was heated to 80° C. and then stirred at the same temperature for 24 hours to undergo sulfonation. The reaction mixture was poured into water at 0° C., separated by filtration, and washed with water. The solid product which was consequently obtained was neutralized with 500 ml of an aqueous 10 wt % sodium hydroxide solution and thoroughly washed with water. The product was then dried at 80° C. for 10 hours by use of a vacuum drier to obtain 173 g of sulfonic acid group-containing polystyrene polymer particles having an average particle diameter of 2.5 μm (hereinafter referred to as "dispersed phase particles (7)"). The dispersed phase particles (7) were found to have an anion dissociating group density of 4.1 mg equivalent/g.

The amount 30 g of the dispersed phase particles (7) was dried at 150° C. for 3 hours, left absorbing the moisture in the air until the water content thereof reached 2.0% by weight, and uniformly dispersed in an insulating liquid prepared by adding 7 g of the additive dispersion (21) obtained in Synthetic Example 21 to 63 g of silicone oil "KF96-20cs", to produce an electrorheological fluid (22) of this invention.

Example 23

An electrorheological fluid (23) of this invention was obtained by following the procedure of Example 22 while using 4 g of the additive dispersion (22) obtained in Synthetic Example 22 in the place of the additive dispersion (21).

Example 24

The procedure of Example 1 was repeated, except that 15 g of additive dispersion (23) obtained in Synthetic Example 23 was used instead of additive dispersion (1), and 55 g of electric insulating oil containing mainly mineral hydrocarbon having a viscosity of 10 cs (a high voltage insulating oil sold by Cosmo Co., Ltd. in Japan), to give rise to an electrorheological fluid (24).

Example 25

The procedure of Example 1 was repeated, except that 6 g of additive dispersion (24) obtained in Synthetic Example 24 was used instead of additive dispersion (1), and 64 g of electric insulating oil containing mainly mineral hydrocarbon having a viscosity of 10 cs (supra) was used, to give rise to an electrorheological fluid (25).

Example 26

An electrorheological fluid (26) of this invention was obtained by following the procedure of Example 7 while using 0.5 g of the additive dispersion (25) obtained in Synthetic Example 25 in the place of the additive dispersion (7) and 69.5 g of electric insulating oil containing mainly mineral hydrocarbon having a viscosity of 10 cs in the place of the silicone oil "KK96-20cs".

Example 27

A thousand two hundred grams (1,200 g) of deionized water and 16 g of Poval "PVA-205" (supra) were placed and dissolved in each other in a 3,000 ml, four necked flask provided with a stirrer, a reflux condenser, a thermometer, and a nitrogen gas introducing port. To the resultant solution, was added a mixture consisting of 250 g of styrene, 50 g of Industrial divinyl benzene (supra), and 5 g of benzoyl peroxide. The resultant mixture in the flask was dispersed using a dispersing device operated at a rate of 4,000 r.p.m. and heated at 70° C. for six hours and at 90° C. for two hours. By separating the solid content of the produced reaction solution by filtration, thoroughly washing the separated solid content with acetone and water, and drying the washed solid content using an air oven at 80° C. for 12 hours, 291 g of a cross-linked polymer (hereinafter referred to as "cross-linked polymer (8)") was obtained.

Then, in a 1,000 ml, three-necked flask provided with a stirrer, a reflux condenser, and thermometer, 500 g of 98 wt % sulfuric acid and 100 g of the cross-linked polymer (8) were added and cooled with ice. The mixture was stirred and heated at 80° C. for 24 hours to effect a sulfonation reaction. Thereafter, the resultant reaction mixture was poured into water at 0° C. and the solid content thereof was separated by filtration and washed with water.

The solid product thus obtained was neutralized with 380 ml of an aqueous 10 wt % sodium hydroxide solution and thoroughly washed with water. Then, it was dried using a vacuum oven at 80° C. for 10 hours, to produce 187 g of organic polymer particles having an average particle diameter of 11 mm (hereinafter referred to as "dispersed-phase particles (8)"). The anionic dissolution group density of the dispersed-phase particles (8) was 4.2 mg equivalent/g.

An electrorheological fluid (27) of the invention was obtained by drying 30 g of the dispersed-phase particles (8) at 150° C. for three hours, moistening the dried particles by standing in a chamber at a temperature of 20° C. and a relative humidity of 60% for 30 minutes, and dispersing the moistened particles uniformly in an insulating liquid prepared by adding 15 g of the additive dispersion (26) obtained in Synthetic Example 26 to 65 g of silicone oil "KF 96-20cs" (supra).

Example 28

The procedure of Example 27 was repeated, except that 2.5 g of additive dispersion (27) obtained in Synthetic Example 27 was used instead of additive dispersion (28) and the amount of silicone oil "KF 96-20cs" (supra) was changed to 67.5 g, to give rise to an electrorheological fluid (28).

Synthetic Example 28

In a four-neck flask having an inner volume of 500 ml and provided with a stirrer, a reflux condenser, a thermometer, and a nitrogen inlet tube, 150 g of toluene, 1.5 g of azo-bis-isobutyronitrile, 80 g of styrene, and 20 g of dodecyl methacrylate were placed and stirred for 30 minutes as kept swept meanwhile with nitrogen gas. The resultant mixture was heated at 70° C. for 20 hours and heated and stirred at 85° C. for 4 hours to be polymerized. After the reaction was completed, the resultant reaction solution was distilled under a reduced pressure to expel a volatile component and obtain comparative composite polymer (28) formed of a styrene-dodecyl methacrylate copolymer.

Synthetic Example 29

350 g of isopropyl alcohol, 2.5 g of polyvinyl pyrrolidone, 1 g of azobisisobutyronitrile, and 50 g of styrene were charged into a 500 ml, four necked flask equipped with a stirrer, a reflux condenser, a thermometer, and a nitrogen gas introducing port. Stirring was carried out at room temperature for 30 minutes while introducing nitrogen gas. The stirred mixture was heated at 70° C. for 24 hours to polymerize. To the reaction solution, was added 200 g of silicone oil "KF 96-20cs" (supra). The resultant solution was dried using in evaporator under a reduced pressure to remove the volatile components to give rise to a silicone oil dispersion of polystyrene particle (29) (having polystyrene particle (29) content of 20% by weight; hereinafter referred to as "comparative additive dispersion (29)").

Synthetic Example 30

In a four-neck flask having an inner volume of 500 ml and provided with a stirrer, a reflux condenser, a thermometer, and a nitrogen inlet tube, 350 g of isopropyl alcohol, 2.5 g of polyvinyl pyrrolidone, 1 g of azo-bis-isobutyronitrile, and 50 g of styrene as a polymerizing monomer (α) were placed and then stirred at room temperature for 30 minutes as kept swept meanwhile with nitrogen gas. The stirred mixture was heated at 70° C. for 24 hours to be polymerized. The resultant reaction solution, with 200 g of silicone oil "KF96-20cs" added dropwise thereto, was dried in an evaporator under reduced pressure to expel the volatile component and obtain a silicone oil dispersion of polystyrene particle(30) (polystyrene particle(30) content 20% by weight; hereinafter referred to as "comparative additive dispersion (30).

Synthetic Example 31

In a four-neck flask having an inner volume of 500 ml and provided with a stirrer, a reflux condenser, a thermometer, and a nitrogen inlet tube, 200 g of toluene, 3 g of azo-bis-isobutyronitrile, 50 g of methacryloyl group-containing polydimethyl siloxane "Sairapurehn FM0721" and 50 g of methyl methacrylate were placed and stirred at room temperature for 30 minutes as kept swept meanwhile with nitrogen gas. The stirred mixture was heated at 70° C. for 3 hours to be polymerized. After the reaction was completed, the reaction solution was heated in an evaporator under a reduced pressure to expel the solvent and obtain an oily polymer (31).

In a four-neck flask having an inner volume of 500 ml and provided with a stirrer, a reflux condenser, a thermometer, and a nitrogen inlet tube, 350 g of isopropyl alcohol, 2 g of polymer (31), 2 g of azo-bis-isobutyronitrile, and 50 g of styrene as a polymerizing monomer (α) were placed and then stirred at room temperature for 30 minutes as kept swept meanwhile with nitrogen gas. The stirred mixture was heated at 70° C. for 24 hours to be polymerized. The resultant reaction solution, with 200 g of silicone oil "KF96-20cs") added dropwise thereto, was dried in an evaporator under to expel the volatile component and obtain a silicone oil dispersion of comparative composite polymer (31) (comparative composite polymer (3) content 20% by weight; hereinafter referred to as "comaprative additive dispersion (31).

Synthetic Example 32

In a four-neck flask having an inner volume of 500 ml and provided with a stirrer, a reflux condenser, a thermometer, and a nitrogen inlet tube, 200 g of toluene, 1 g of azo-bis-isobutyronitrile, 5 g of methacryloyl group-containing polydimethyl siloxane "Sairapurehn FM0721", and 95 g of dodecyl methacrylate were placed and then stirred at room temperature for 30 minutes as kept swept meanwhile with nitrogen gas. The resultant mixture was heated at 70° C. for 24 hours to be polymerized. After the reaction was completed, the reaction solution was heated in an evaporator under a reduced pressure to expel the solvent and obtain oily polymer (32).

In a four-neck flask having an inner volume of 500 ml and provided with a stirrer, a reflux condenser, a thermometer, and a nitrogen inlet tube, 350 g of isopropyl alcohol, 2.0 g of polymer (32), 1 g of azo-bis-isobutyronitrile, and 50 g of styrene as the polymerizable monomer (α) were placed and then stirred at room temperature for 30 minutes as kept swept meanwhile with nitrogen gas. The stirred mixture was heated at 70° C. for 24 hours to be polymerized. The reaction product thus obtained, with 200 g of silicone oil "KF96-20cs" added dropwise thereto, was dried in an evaporator under reduced pressure to expel the volatile component by distillation and obtain a silicone oil dispersion of comparative composite polymer (32) (comparative composite polymer (32) content 20% by weight; hereinafter referred to as comparative additive dispersion (32).

Synthetic Example 33

100 ml of toluene, 2 g of azobisisobutyronitrile, 35 g of methacryloyl group-containing polydimethyl siloxane "Sairapurehn FM0721" (supra), and 35 g of methacryloyl group-containing methoxy polyethylene glycol "NK ester M- 230G" (supra) were charged into a 200 ml flask. Polymerization was carried out at 70° C. for 5 hours. After reaction, the used solvent was distilled out using an evaporator under a reduced pressure to give rise to a polymer.

68 g of silicone oil "KF 96-20cs" (supra), and 15 g of Spherical silica fine particle (having an average particle diameter of 1 mm) (supra) were charged to a 200 ml flask to form a dispersion, to which was added 2 g of the above polymer to be dispersed. A silicone oil dispersion of additive (33) was produced in which the silica particles and the polymer do not compose and separately are dispersed (having additive (33) content of 20% by weight; hereinafter referred to as "comparative additive dispersion (33)").

Synthetic Example 34

An comparative additive dispersion (34) was obtained by adding 0.2 g of oil polymer (9) synthesized in Synthetic Example 9 to 20 g of the comparative additive dispersion (30) prepared in Synthetic Example 30 and stirring them for dispersion.

Synthetic Example 35

150 ml of methanol, 50 ml of deionized water, and 10 g of Spherical silica fine particle (having an average particle diameter of 1 mm) (supra) were charged into a 300 ml flask to form a dispersion, to which was added 5 g of γ-(methacryloxy propyl) trimethoxy silane. The reaction was carried out at 40° C. for 2 hours allowing the methacryloyl group to introduce to the surface of the spherical silica particle. The mixture was subjected to a reduction distillation using an evaporator, and dried at 50° C. with a vacuum dryer to give rise to a product. 150 ml of toluene and 15 g of the resultant product were charged into a 200 ml flask to form a dispersion, to which were added 0.1 g azobisisobutyronitrile, and 1.5 g of methacryloyl group-containing polydimethyl siloxane "Sairapurehn RM0721" (supra). The reaction was carried out at 70° C. for 5 hours. To the reaction solution, was added 66 g of electric insulating oil containing mainly mineral hydrocarbon having a viscosity of 10 cs (supra). The resultant reaction solution was subjected to a reduction distillation using an evaporator to remove the volatile components and to give rise to an electrically Insulating dispersion of comparative composite polymer (35) (having comparative composite polymer (35) content of 20% by weight; hereinafter referred to as "comparative additive dispersion (35)").

Synthetic Example 36

200 g of deionized water, 2 g of sodium dodecylsulfonate, and 1 g of sodium persulfate were added into a 500 ml, four necked flask equipped with a stirrer, a reflux condensers a thermometers and a nitrogen gas introducing port to be dissolved, and to which were added 35 g of styrene, and 15 g of Industrial divinyl benzene (supra). Emulsion treatment was carried out while stirring at 20,000 r.p.m. using the dispersion device for 2 minutes while introducing nitrogen gas. The emulsified solution was heated at 70° C. for 3 hours, and further heated at 90° C. for 4 hours to polymerize. The treated solution was heated using an evaporator under a reduced pressure to remove the water. The resultant material was dried in an oven at 80° C. for a night to give rise to a crosslinked polymer particle (36) (hereinafter referred to as "comparative additive dispersion (36)").

Synthetic Example 37

In a flask having an inner volume of 300 ml, 150 ml of methanol and 50 ml of deionized water were placed and 10 g of truly spherical silica particles having an average particle diameter of 1 μm (produced by Nippon Shokubai Co., Ltd.) were dispersed in the aqueous methanol solution. The resultant dispersion and 5 g of methacryloxypropyl trimethoxy silane added thereto were left reacting at 40° C. for 2 hours to introduce the methacryloyl group to the surface of the spherical silica particles. Then, the dispersion was heated in an evaporator under a reduced pressure to expel the solvent and dried at 50° C. in a vacuum drier to obtain a reactant. Then 150 ml of toluene was charged into a flask having inner volume of 200 ml and 15 g of the reactant was dispersed. The dispersed reactant and 0.1 g of azo-bis-isobutyronitrile, 0.1 g of methacryloyl group containing polydimethyl siloxane "Sairapurehn FM0721", and 1.4 g of dodecyl methacrylate solved therein were left reacting at 70° C. for 5 hours. The reaction solution, with 66 g of silicone oil "KF96-20cs" added dropwise thereto, was distilled in an evaporator under a reduced pressure to expel the volatile component and obtain a silicone oil dispersion of comparative composite polymer (37) (comparative composite polymer (37) content of 20% by weight; hereinafter referred to as "comparative additive dispersion (37)").

Synthetic Example 38

567 g of isopropyl alcohol, 6 g of azobisisobutyronitrile, 10 g of methacryloyl group-containing methoxy polyethylene glycol "NK ester M-230G" (supra) 20 g of Industrial divinyl benzene (supra), and 70 g of styrene were charged into a 1000 ml, four necked flask equipped with a stirrer, a reflux condenser, a thermometer, and a nitrogen gas introducing port. Stirring was carried out at room temperature for 30 minutes while introducing nitrogen gas. The mixture was heated at 65° C. for 20 hours, and further heated at 83° C. for 4 hours to be polymerized. After the addition of 400 g of silicone oil "KF 96-20cs" (supra) into the reaction solution, the volatile components of the reaction solution was distilled out using an evaporator under a reduced pressure to give rise to a silicone oil dispersion of comparative composite polymers (38) (having comparative composite polymer content of 20% by weight; hereinafter referred to as "comparative additive dispersion (38)").

Synthetic Example 39

567 g of isopropyl alcohol, 6 g of azobisisobutyronitrile, 30 g of methacryloyl group-containing polydimethyl siloxane "Sairapurehn FM0721" (supra) 20 g Industrial divinyl benzene (supra) and 40 g of styrene were charged into a 1,000 ml, four necked flask equipped with a stirrer, a reflux condenser, a thermometer, and a nitrogen gas introducing port. Stirring was carried out at room temperature for 30 minutes while introducing nitrogen gas. The mixture was heated at 69° C. for 20 hours, and further heated at 83° C. for 4 hours to polymerize. To the reaction solution, were added 400 g of silicone oil "KF 96-20cs" (supra). The resultant mixture was distilled using an evaporator under a reduced pressure to remove and to give rise to a silicone oil dispersion of comparative composite polymer (39) (having comparative composite polymer (39) content of 20% by weight; hereinafter referred to as "comparative additive dispersion (39)").

Referential Example 40

In a four-neck flask having an inner volume of 1,000 ml and provided with a stirrer, a reflux condenser, a thermometer, and a nitrogen inlet tube, 567 g of isopropyl alcohol, 5 g of azo-bis-isobutyronitrile, 35 g of methacryloyl group-containing polydimethyl siloxane "Sairapurehn FM0725", 40 g of methacryloyl group-containing polyethylene glycol tetraethylene glycol "Blemmer 55PET-800" and 25 g of industrial grade divinyl benzene were placed and stirred at room temperature for 30 minutes as kept swept meanwhile with nitrogen gas. The stirred mixture was heated at 65° C. for 20 hours and then further heated at 83° C. for 4 hours to be polymerized. When the solid component in the reaction solution was assayed, the conversion of monomer was found to be 98%. The reaction solution, with 392 g of a silicone oil "KF96-20cs" added dropwise thereto, was heated in an evaporator under a reduced pressure to expel the volatile component and obtain a silicone oil dispersion of comparative composite polymer (40) (comparative composite polymer (40) content 20% by weight; hereinafter referred to as "comparative additive dispersion (40)").

Comparative Example 1

A comparison electrorheological fluid (hereinafter referred to as "comparative fluid (1)") was produced by drying 30 g of dispersed-phase particle (8) of Example 27 at 150° C. for three hours, moistening the dried particle by standing in a chamber at a temperature of 20° C. and a relative humidity of 60% for 30 minutes, and dispersing the moistened particles in 70 g of silicone oil "KF 96-20cs" (supra).

Comparative Example 2

30 g of dispersed phase particle (1) in Example 1 was dried at 150° C. for 3 hours, and moistened in the atmosphere to a water content of 2.0% by weight. The regulated dispersed phase particle (1) was mixed with 70 g of silicone oil "KF 96-20cs" (supra) to form a dispersion, to give rise to a comparative fluid (2).

Comparative Example 3

30 g of dispersed phase particle (1) in Example 1 was dried at 150° C. for 3 hours, and moistened in the atmosphere to the water content of 2.0% by weight. The regulated dispersed phase particle (1) was mixed with 70 g of silicone oil "KF 96-10cs" (supra) to form a dispersion, to give rise to a comparative fluid (3).

Comparative Example 4

30 g of dispersed phase particle (1) in Example 1 was dried at 150° C. for 3 hours, and moistened in the atmosphere to a water content of 2.0% by weight. The regulated dispersed phase particle (1) was mixed with 70 g of electric insulating oil containing mainly mineral hydrocarbon of 10 cs (supra) to form a dispersion, to give rise to a comparative fluid (4).

Comparative Example 5

30 g of dispersed phase particle (2) in Example 4 was dried at 150° C. for 3 hours, and moistened in the atmosphere to a water content of 2.0% by weight. The regulated dispersed phase particle (3) was mixed with 70 g of silicone oil "KF 96-20cs" (supra) to form a dispersion, to give rise to a comparative fluid (5).

Comparative Example 6

A comparative fluid (6) was obtained by drying 30 g of the dispersed phase particle (3) obtained in Example 7 at 150° C. for 3 hours, allowing the dried particles to absorb the moisture in the air until the water content thereof reached 2.0% by weight, and dispersing the wet particles by stirring in 70 g of a silicone oil "KF96-20cs".

Comparative Example 7

A comparative fluid (7) was obtained by drying 30 g of the dispersed phase particle (3) obtained in Example 7 at 150° C. for 3 hours, allowing the dry particles to absorb the moisture in the air until the water content thereof reached 2.0% by weight, and dispersing the particles by stirring in 70 g of electric insulating oil containing mainly hydrocarbon of 10 cs; (produced by Cosmo Oil Co., Ltd.).

Comparative Example 8

30 g of the dispersed phase particles (4) obtained in Example 8 was dried at 150° C. for three hours and then left absorbing the moisture in the air until the water content thereof reached 2.0% by weight. An comparative fluid (8) was obtained by dispersing the dispersed phase particles in 70 g of a silicone oil of 20 cs "KF96-20cs".

Comparative Example 9

A comparative fluid (9) was obtained by drying 30 g of the dispersed phase particles (5) obtained in Example 9 at 150° C. for 3 hours, then allowing the dry disperse particles to absorb the moisture in the air until the water content thereof reached 2.0% by weight, and dispersing wet dispersed phase particles in 70 g of silicone oil of 20 cs "KF96-20cs".

Comparative Example 10

A comparative fluid (10) was obtained by drying 30 g of the dispersed particle (5) obtained in Example 9 at 150° C. for 3 hours, then allowing the dry dispersed phase particles to absorb the moisture in the air until the water content thereof reached 2.0% by weight, and dispersing the wet dispersed phase particles in 70 g of silicone oil of 10 cs "KF96-10cs".

Comparative Example 11

A comparative fluid (11) was obtained by drying 30 g of the dispersed phase particles (7) obtained in Example 22 at 150° C. for 3 hours, then allowing the dry dispersed phase particles to absorb the moisture in the air until the water content thereof reached 2.0% by weight, and dispersing the wet dispersed phase particles in 70 g of silicone oil of 20 cs "KF96-20cs".

Comparative Example 12

A comparative fluid (12) was obtained by drying 30 g of the dispersed phase particles (6) obtained in Example 13 at 150° C. for 3 hours, then allowing the dry disperse particles to absorb the moisture in the air until the water content thereof reached 10.0% by weight, and dispersing the dispersed phase particles in 70 g of silicone oil of 20 cs "KF96-20cs".

Comparative Example 13

The procedure of Example 27 was repeated, except that 10 g of amino modified silicone having nitrogen atom (a silicone additive, under the tradename of "KF8005", sold by Shin-etsu Chemical Industry Co., Ltd. in Japan) was used instead of additive dispersion (1) in Example 1, and the amount of silicone oil "KF 96-20cs" (supra) was changed to 60 g, to give rise to a comparative fluid (13).

Comparative Example 14

An comparative fluid (14) was obtained by drying 30 g of the dispersed phase particles (3) obtained in Example 7 at 150° C. for 3 hours, allowing the dry particles to absorb the moisture in the air until the water content thereof reached 2.0% by weight, and dispersing the particles by stirring in 68 g of electric insulating oil containing mainly mineral hydrocarbon of 10 cs (produced by Cosmo Oil Co., Ltd.) having dissolved in advance therein 2.0 g of the comparative composite polymer (28) obtained in Synthetic Example 28.

Comparative Example 15

30 g of the dispersed phase particle (4) obtained in Example 8 was dried at 150° C. for 3 hours and then left absorbing the moisture in the air until the water content thereof reached 2.0% by weight. An comparative fluid (15) was obtained by uniformly dispersing the dispersed phase particles in an insulating liquid prepared by adding 1.5 g of a powdery silica having an average particle diameter of 0.007 µm(produced by Japan Aerosil Co., Ltd. and marketed under trademark designation of "AEROSIL380") to 68.5 g of silicone oil "KF96-20cs".

Comparative Example 16

The procedure of Example 1 was repeated, except that 4 g of comparative additive dispersion (29) in Synthetic Example 29 was used instead of additive dispersion (1) in Example 1, and the amount of silicone oil "KF 96-20cs" (supra) was changed to 66 g, to give rise to a comparative electrorheological fluid (16).

Comparative Example 17

An comparative fluid (17) was obtained by following the procedure of Example 9 while using 4 g of the comparative additive dispersion (30) obtained in Synthetic Example 30 in the place of the additive dispersion (9) and changing the amount of the silicone oil "KF96-20cs" to 66 g.

Comparative Example 18

A comparative fluid (18) was obtained by following the procedure of Example 9 while using 4 g of the comparative additive dispersion (31) obtained in Synthetic Example 31 in the place of the additive dispersion (9) and changing the amount of the silicone oil "KF96-20cs" to 66 g.

Comparative Example 19

A comparative fluid (19) was obtained by following the procedure of Example 9 while using 5 g of the comparative additive dispersion (32) obtained in Synthetic Example 32 in the place of the additive dispersion (9) and changing the amount of the silicone oil "KF96-20cs" to 65 g.

Comparative Example 20

The procedure of Example 1 was repeated, except that 4 g of comparative additive dispersion (33) in Synthetic Example 33 was used instead of additive dispersion (1) in Example 1, and the amount of silicone oil "KF 96-20cs" (supra) was changed to 66 g, to give rise to a comparative electrorheological fluid (20).

Comparative Example 21

A comparative fluid (21) was obtained by following the procedure of Example 9 while using 5 g of comparative additive dispersion (34) in Synthetic Example 34 in the place of the additive dispersion (9) and changing the amount of the silicone oil "KF96-20cs" to 65 g.

Comparative Example 22

The procedure of Example 1 was repeated, except that 4 g of comparative additive dispersion (35) in Synthetic Example 35 was used instead of additive dispersion (1) in Example 1, and 66 g of electric insulating oil containing mainly mineral hydrocarbon of 10 cs (supra) were used instead of silicone oil, to give rise to a comparative electrorheological fluid (22).

Comparative Example 23

The procedure of Example 1 was repeated, except that 1 g of comparative additive (36) in Synthetic Example 36 was used instead of additive dispersion (1), and the amount of silicone oil "KF 96-20cs" (supra) was changed to 69 g, to give rise to a comparative electrorheological fluid (23).

Comparative Example 24

The procedure of Example 1 was repeated, except that 1 g of comparative additive (36) in Synthetic Example 36 was used instead of additive dispersion (1), and 69 g of electric insulating oil containing mainly mineral hydrocarbon of 10 cs (supra) were used instead of silicone oil, to give rise to a comparative fluid (24).

Comparative Example 25

A comparative fluid (25) was obtained by following the procedure of Example 22 while using 5 g of the comparative additive dispersion (37) obtained in Synthetic Example 37 in the place of the additive dispersion (22) and changing the amount of the silicone oil "KF96-20cs" to 65 g.

Comparative Example 26

The procedure of Example 27 was repeated, except that 15 g of comparative additive dispersion (38) in Synthetic Example 38 was used instead of additive dispersion (26), and the amount of silicone oil "KF 96-20cs" (supra) was changed to 55 g, to give rise to a comparative fluid (26).

Comparative Example 27

The procedure of Example 27 was repeated, except that 15 g of comparative additive dispersion (39) in Synthetic Example 39 was used instead of additive dispersion (26), and the amount of silicone oil "KF 96-20cs" (supra) was changed to 55 g, to give rise to a comparative fluid (27).

Comparative Example 28

A comparative fluid (28) was obtained by following the procedure of Example 9 while using 20 g of the comparative additive dispersion (40) obtained in Synthetic Example 40 in the place of the additive dispersion (9) and changing the amount of the silicone oil "KF96-20cs" to 50 g.

Comparative Example 29

The viscosity $\eta_1(3.3/S)$ and $\eta_2(33/S)$ of each of the electrorheological fluids of the present invention (1)–(28) in Examples 1–28 and the comparative fluids (1)–(28) in Comparative Examples 1–28, was measured at 25° C. under the conditions of shear rates respectively of 3.3/S and 33/S to determine the Ti values thereof in accordance with the formula (1) mentioned above in the absence of supply of an electric field.

Each of electrorheological fluids and comparative fluids was filled to 100 mm from the bottom of a test tube having a height of 150 mm and a diameter of 15 mm. The tube was airtightly sealed, and left standing at room temperature so as to monitor the sedimentation of the dispersed phase particle. The height of the sedimentation layer, which occurred from sedimentation of the dispersed phase particle of the electrorheological fluid, was measured after a day and a week to evaluate the dispersion stability of an electrorheological fluid.

50 ml of each of the electrorheological fluids and the comparative fluids were charged into a 100 ml vessel, which was airtightly sealed. After being left standing for a month, the vessel was rotated at 30 r.p.m. to resume the initial uniform state of the test sample. A number of rotation required for each fluid to resume the initial uniform state was measured to evaluate re-dispersibility. The test results are shown in Table 1 below.

Each of the electrorheological fluids and the comparative fluids was measured using a coaxial rotary viscometer with electric fields for the value of shear stress (initial) and the simultaneous electric current density (initial) when an alternating electric current external electric field 4,000 V/mm (frequency: 50 Hz) was applied at 25° C. under the conditions of a gap between outer and inner cylinders of 1.0 mm and a shear rate of 33/s. Each of the electrorheological fluids and the comparative fluids was continuously treated using the viscometer under the conditions of 25° C. and an external electric field loading of 4,000 V/mm for 3 days, and then measured for shear stress and for current density to evaluate the stability with time. The test results are shown in Table 1.

It is clearly noted from Table 1 that electrorheological fluids (1) to (28) of this invention were endowed with structural viscosity and therefore were excellent in fluidity dispersion stability and redispersibilityas evinced by the fact that the values of $\eta 2$ were not more than 0.2 Pa•s and the Ti values were in the range of satisfying and condition of the formula (1).

In contrast thereto, the comparative fluids (1) to (13), (18), (20), (22), (26) and (27) were deficient in dispersion stability because of small Ti values.

Then, the comparative fluids (14) to (17), (19), (21), (23) to (25) and (28) were deficient in redispersibility and/or fluidity because their values of $\eta 2$ exceeded 0.2 Pa•s

TABLE 1

| | $\eta_1$ | $\eta_2$ | Ti | After 1 day | After 1 week | redis- persibility | Shear Stress (g/cm$^2$) | | Current Density (μA/cm$^2$) | |
|---|---|---|---|---|---|---|---|---|---|---|
| | (Pa · s) | (Pa · s) | ($\eta_1-\eta_2$) | (mm) | (mm) | (number) | initial | 3 days | initial | 3 days |
| Example | | | | | | | | | | |
| 1 | 0.170 | 0.093 | 0.067 | 92 | 86 | 7 | 21 | 22 | 20 | 21 |
| 2 | 0.093 | 0.071 | 0.022 | 88 | 83 | 5 | 22 | 22 | 20 | 22 |
| 3 | 0.160 | 0.095 | 0.065 | 90 | 83 | 12 | 19 | 20 | 20 | 22 |
| 4 | 0.098 | 0.074 | 0.024 | 90 | 89 | 5 | 9 | 8 | 18 | 18 |
| 5 | 0.102 | 0.068 | 0.062 | 81 | 79 | 8 | 8 | 7 | 20 | 19 |
| 6 | 0.235 | 0.145 | 0.090 | 72 | 68 | 8 | 21 | 22 | 20 | 18 |
| 7 | 0.130 | 0.073 | 0.057 | 93 | 90 | 5 | 21 | 21 | 18 | 18 |
| 8 | 0.180 | 0.095 | 0.085 | 85 | 81 | 8 | 21 | 20 | 20 | 21 |
| 9 | 0.093 | 0.080 | 0.013 | 92 | 86 | 7 | 21 | 22 | 20 | 21 |
| 10 | 0.109 | 0.075 | 0.034 | 83 | 80 | 10 | 22 | 23 | 21 | 22 |
| 11 | 0.140 | 0.090 | 0.050 | 90 | 83 | 12 | 21 | 21 | 20 | 21 |
| 12 | 0.260 | 0.180 | 0.080 | 93 | 91 | 15 | 5 | 4 | 30 | 31 |
| 13 | 0.150 | 0.110 | 0.040 | 88 | 85 | 7 | 21 | 22 | 20 | 21 |
| 14 | 0.164 | 0.105 | 0.059 | 92 | 86 | 9 | 20 | 19 | 20 | 19 |
| 15 | 0.134 | 0.090 | 0.044 | 80 | 75 | 10 | 22 | 23 | 21 | 22 |
| 16 | 0.195 | 0.120 | 0.075 | 85 | 83 | 12 | 19 | 20 | 20 | 22 |
| 17 | 0.162 | 0.104 | 0.058 | 83 | 75 | 12 | 19 | 20 | 19 | 17 |
| 18 | 0.110 | 0.052 | 0.058 | 98 | 98 | 4 | 17 | 16 | 16 | 16 |
| 19 | 0.200 | 0.110 | 0.090 | 85 | 81 | 8 | 21 | 20 | 20 | 21 |
| 20 | 0.240 | 0.195 | 0.045 | 70 | 68 | 20 | 22 | 22 | 21 | 22 |
| 21 | 0.080 | 0.061 | 0.019 | 83 | 81 | 7 | 20 | 19 | 19 | 19 |
| 22 | 0.190 | 0.100 | 0.090 | 87 | 86 | 9 | 10 | 11 | 20 | 21 |
| 23 | 0.104 | 0.073 | 0.031 | 83 | 81 | 8 | 9 | 10 | 19 | 20 |
| 24 | 0.205 | 0.115 | 0.090 | 92 | 90 | 9 | 20 | 19 | 19 | 18 |
| 25 | 0.195 | 0.099 | 0.096 | 90 | 88 | 8 | 19 | 19 | 18 | 18 |
| 26 | 0.180 | 0.110 | 0.070 | 85 | 81 | 12 | 15 | 15 | 14 | 14 |
| 27 | 0.131 | 0.126 | 0.005 | 95 | 92 | 4 | 21 | 22 | 20 | 21 |
| 28 | 0.141 | 0.125 | 0.016 | 90 | 80 | 20 | 22 | 23 | 21 | 22 |
| Comparative Example | | | | | | | | | | |
| 1 | 0.047 | 0.045 | 0.002 | 35 | 35 | >100 | 25 | 26 | 22 | 23 |
| 2 | 0.046 | 0.045 | 0.001 | 35 | 35 | 60 | 24 | 23 | 22 | 21 |
| 3 | 0.035 | 0.034 | 0.001 | 35 | 35 | 50 | 22 | 22 | 20 | 20 |
| 4 | 0.037 | 0.036 | 0.001 | 35 | 35 | 60 | 21 | 20 | 22 | 20 |
| 5 | 0.049 | 0.045 | 0.004 | 35 | 35 | 50 | 10 | 11 | 19 | 20 |
| 6 | 0.047 | 0.045 | 0.002 | 35 | 35 | 60 | 21 | 21 | 18 | 18 |
| 7 | 0.032 | 0.030 | 0.002 | 35 | 35 | 60 | 17 | 16 | 16 | 16 |
| 8 | 0.040 | 0.038 | 0.002 | 34 | 34 | 60 | 24 | 23 | 22 | 21 |
| 9 | 0.047 | 0.045 | 0.002 | 35 | 35 | 60 | 24 | 23 | 22 | 21 |
| 10 | 0.036 | 0.034 | 0.002 | 35 | 35 | 60 | 22 | 22 | 20 | 20 |
| 11 | 0.042 | 0.038 | 0.004 | 35 | 35 | 50 | 10 | 11 | 19 | 20 |
| 12 | 0.058 | 0.052 | 0.006 | 40 | 40 | 65 | 4 | 4 | 32 | 32 |
| 13 | 0.120 | 0.118 | 0.002 | 92 | 35 | >100 | 18 | 19 | 27 | * |
| 14 | 0.690 | 0.220 | 0.540 | 83 | 83 | >100 | 4 | 4 | 8 | 9 |
| 15 | 0.400 | 0.240 | 0.160 | 76 | 73 | 15 | 3 | 3 | 13 | 14 |
| 16 | 0.420 | 0.340 | 0.080 | 71 | 70 | >100 | 23 | 22 | 20 | 20 |
| 17 | 0.610 | 0.505 | 0.105 | 71 | 70 | >100 | 23 | 22 | 20 | 20 |
| 18 | 0.105 | 0.100 | 0.005 | 50 | 45 | 15 | 23 | 22 | 20 | 20 |
| 19 | 0.286 | 0.280 | 0.006 | 88 | 87 | >100 | 24 | 23 | 22 | 21 |
| 20 | 0.061 | 0.055 | 0.006 | 35 | 35 | 60 | 23 | 24 | 22 | 21 |

TABLE 1-continued

| | $\eta_1$ | $\eta_2$ | Ti | After 1 day | After 1 week | redis- persibility | Shear Stress (g/cm$^2$) | | Current Density (µA/cm$^2$) | |
|---|---|---|---|---|---|---|---|---|---|---|
| | (Pa · s) | (Pa · s) | ($\eta_1$–$\eta_2$) | (mm) | (mm) | (number) | initial | 3 days | initial | 3 days |
| 21 | 0.320 | 0.210 | 0.110 | 75 | 70 | >100 | 20 | 19 | 17 | 17 |
| 22 | 0.055 | 0.048 | 0.007 | 40 | 35 | 50 | 19 | 18 | 20 | 19 |
| 23 | 0.270 | 0.244 | 0.026 | 65 | 60 | >100 | 6 | 6 | 10 | 11 |
| 24 | 0.292 | 0.253 | 0.039 | 65 | 60 | >100 | 6 | 6 | 13 | 14 |
| 25 | 0.400 | 0.320 | 0.080 | 69 | 64 | >100 | 7 | 8 | 18 | 19 |
| 26 | 0.070 | 0.065 | 0.005 | 35 | 35 | >100 | 23 | 21 | 23 | 25 |
| 27 | 0.092 | 0.088 | 0.004 | 35 | 35 | >100 | 22 | 22 | 22 | 22 |
| 28 | 0.400 | 0.280 | 0.120 | 95 | 90 | >100 | 21 | 21 | 20 | 19 |

*not measured It was not measured beyond the range of the viscometer.

We claim:

1. An electrorheological fluid comprising i) dielectric particles, ii) an insulating liquid, and iii) a composite polymer exhibiting substantial insolubility in said insulating liquid, said composite polymer comprising particles substantially insoluble in said insulating liquid, and a polysiloxane-containing polymer having a silicone component-containing structural unit (A)

and a dielectric particle-adsorbing chain-containing structural unit (B), as polysiloxane-containing structural unit (A-1) represented by the general formula (4):

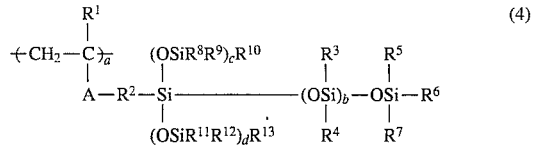

wherein A is —COO— or phenylene group, $R^1$ hydrogen atom or methyl group, $R^2$ is an alkylene group of 1 to 6 carbon atoms, $R^3$ to $R^{13}$ are independently as aryl group, an alkyl group of 1 to 6 carbon atoms, or an alkoxy group of 1 to 10 carbon atoms, a is an arbitrary integer, c and d are independently an integer in the range of 0 to 10, and b is an integer in the range of 0 to 200, and as the dielectric particle-adsorbing chain-containing structural unit (B) thereof at least one member selected from the group consisting of an alkylene oxide chain-containing structural unit (B-1) represented by the general formula (5):

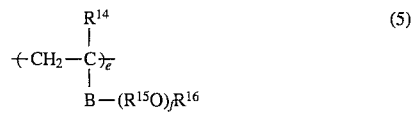

wherein B is —COO— or phenylene group, $R^{14}$ is hydrogen atom or methyl group, $R^{15}$ is an alkylene group of 2 to 4 carbon atoms, $R^{16}$ is hydrogen atom or an alkyl group, e is an arbitrary integer, and f is an integer in the range of 2 to 100, a nitrogen atom-containing structural unit (B-2) represented by the general formula (6):

wherein D is

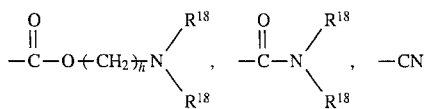

or a nitrogen-containing heterocycle-containing substituent, $R^{17}$ is hydrogen atom or methyl group, $R^{18}$ is hydrogen atom or an alkyl group, g is an arbitrary integer, and h is an integer in the range of 2 to 6, and/or a hydrocarbon chain-containing structural unit (B-3) represented by the general formula (7):

wherein E is —COO— or a phenylene groups, $R^{19}$ is hydrogen atom or methyl group, $R^{20}$ is an alkyl group of 4 to 30 carbon atoms, and i is an arbitrary integer, said insulating liquid being present in an amount in the range of 50 to 500 parts by weight, and said composite polymer being present in an amount in the range of 0.01 to 6 parts by weight, both amounts being based on 100 parts by weight of said dielectric particles, said electrorheological fluid exhibiting a viscosity of not more than 0.2 Pa•s at a shear rate of 33/s when measured at 25° C. in the absence of supply of an electric field.

2. An electrorheological fluid according to claim 1, wherein said dielectric particles have an average particle diameter in the range of 1 to 50 µm.

3. An electrorheological fluid according to claim 1, wherein said insulating liquid is a silicon element containing insulating oil and/or a fluorine element containing insulating oil.

4. An electrorheological fluid according to claim 1, wherein said composite polymer is a cross-linked polymer.

5. An electrorheological fluid according to claim 4, wherein said cross-linked polymer is produced by precipitation-polymerization of a monomer mixture (X) containing a silicone macromer (am) represented by the general formula (8):

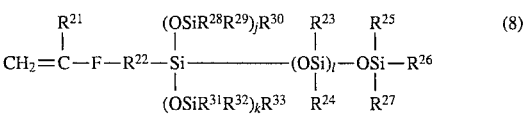

wherein F is —COO— or phenylene group, $R^{21}$ is hydrogen atom or methyl group, $R^{22}$ is an alkylene group of 1 to 6 carbon atoms, $R^{23}$ to $R^{33}$ are independently an aryl group, an alkyl group of 1 to 6 carbon atoms, or an alkoxy group of 1 to 10 carbon atoms, j and k are independently an integer in the range of 0 to 10, and l is an integer in the range of 0 to 200, an alkylene oxide chain-containing macromer (bm-1) represented by the general formula (9):

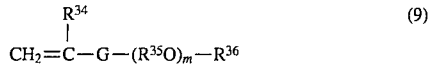

wherein G is —COO— or phenylene group, $R^{34}$ is hydrogen atom or methyl group, $R^{35}$ is an alkylene group of 2 to 4 carbon atoms, $R^{36}$ is hydrogen atom or an alkyl group, and m is an integer in the range of 2 to 100, a crosslinking monomer (cx) having more than two double bonds therein, and an optional monomer (dx).

6. An electrorheological fluid according to claim 5, wherein said monomer mixture (X) contains 10 to 89.9% by weight of said silicone macromer (am), 10 to 89.9% by weight of said alkylene oxide chain-containing macromer (bm-1), 0.1 to 50% by weight of said crosslinking monomer (cx), and 0 to 79.9% by weight of said optional monomer (dx), provided the sum of the monomers used is 100% by weight.

7. An electrorheological fluid according to claim 1, wherein the ratio of said particle to said polysiloxane-containing polymer is 100:0.1–100 parts by weight.

8. An electrorheological fluid according to claim 1, wherein said polysiloxane-containing polymer is fixed on the surface of said particle.

9. An electrorheological fluid according to claim 1, wherein said particle is linked to said polysiloxane-containing polymer by a chemical bonding.

10. An electrorheological fluid according to claim 1, wherein said polysiloxane-containing polymer is obtained by polymerizing a monomer mixture (Y) which comprises a silicone macromer (am) represented by the general formula (8):

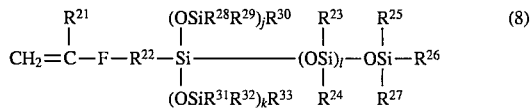

wherein F is —COO— or phenylene group, $R^{21}$ is hydrogen atom or methyl group, $R^{22}$ is an alkylene group of 1 to 6 carbon atoms, $R^{23}$ to $R^{33}$ are independently an aryl group, an alkyl group of 1 to 6 carbon atoms, or an alkoxy group of 1 to 10 carbon atoms, j and k are independently an integer in the range of 0 to 10, and l is an integer in the range of 0 to 200, and at least one dielectric particle-adsorbing chain-containing monomer (b) selected from the group consisting of an alkylene oxide chain-containing macromer (bm-1) represented by the general formula (9):

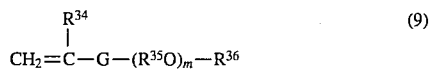

wherein G is —COO— or phenylene group, $R^{34}$ is hydrogen atom or methyl group, $R^{35}$ is an alkylene group of 2 to 4 carbon atoms, $R^{36}$ is hydrogen atom or an alkyl group, and m is an integer in the range of 2 to 100, a nitrogen atom-containing monomer (b-2) represented by the general formula (10):

wherein J is

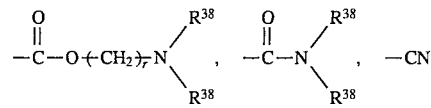

or nitrogen-containing hetero cycle-containing substituent, $R^{37}$ is hydrogen atom or methyl group, $R^{38}$ is hydrogen atom or an alkyl group, and r is an integer in the range of 2 to 6, and a hydrocarbon chain-containing monomer (b-3) represented by the general formula (11):

wherein K is —COO— or phenylene group, $R^{39}$ is hydrogen atom or methyl group and $R^{40}$ is an alkyl group of 4 to 30 carbon atoms, as essential components and an optional monomer (dy).

11. An electrorheological fluid according to claim 10, wherein said monomer mixture (Y) contains 10 to 90% by weight of said silicone macromer (am), 10 to 90% by weight of said dielectric particle-adsorbing chain-containing monomer (by), and 0 to 80% by weight of said optional monomer (dy), provided the sum of the monomers used is 100% by weight.

12. An electrorheological fluid according to claim 1, wherein said composite is obtained by dispersion polymerization of a polymerizable monomer mixture ($\alpha$) in the presence of said polysiloxane-containing polymer to produce said particle.

13. An electrorheological fluid according to claim 1, wherein said composite is produced by emulsion polymerization of a polymerizable monomer mixture ($\alpha$) in the presence of said polysiloxane-containing polymer in an aqueous medium to produce said particle.

14. An electrorheological fluid according to claim 10, wherein said composite is produced by polymerization of said monomer mixture (Y) in the presence of an organic or inorganic fine particle having a polymerizable reaction group as said particle to give rise to said polysiloxane-containing polymer.

15. The electrorheological fluid of claim 1 having a structural viscosity satisfying the condition of the formula (1):

$$0.01\ Pa\cdot s \leq \eta_1 - \eta_2 \leq 0.5\ Pa\cdot s$$

wherein $\eta_1$ is a viscosity at a shear rate of 3.3/s when measured at 25° C. in the absence of supply of an electric field and $\eta_2$ is a viscosity at a shear rate of 3.3/s when measured at 25° C. in the absence of supply of an electric field.

* * * * *